United States Patent
Tsujimoto et al.

(10) Patent No.: US 9,821,391 B2
(45) Date of Patent: Nov. 21, 2017

(54) SAW BLADE AND METHOD FOR ARRANGING SAW TEETH

(71) Applicants: AMADA COMPANY, LIMITED, Kanagawa (JP); AMADA MACHINE TOOLS COMPANY, LTD., Kanagawa (JP)

(72) Inventors: Susumu Tsujimoto, Kanagawa (JP); Takeshi Ueyama, Kanagawa (JP)

(73) Assignees: AMADA COMPANY, LIMITED, Kanagawa (JP); AMADA MACHINE TOOLS COMPANY, LTD., Kanagawa (JP)

(*) Notice: Subject to any disclaimer, the term of this patent is extended or adjusted under 35 U.S.C. 154(b) by 88 days.

(21) Appl. No.: 14/412,022

(22) PCT Filed: Jul. 1, 2013

(86) PCT No.: PCT/JP2013/068017
§ 371 (c)(1),
(2) Date: Dec. 30, 2014

(87) PCT Pub. No.: WO2014/013857
PCT Pub. Date: Jan. 23, 2014

(65) Prior Publication Data
US 2015/0151372 A1    Jun. 4, 2015

(30) Foreign Application Priority Data
Jul. 17, 2012   (JP) .................................. 2012-158410

(51) Int. Cl.
*B27B 13/02*        (2006.01)
*B27B 33/02*        (2006.01)
(Continued)

(52) U.S. Cl.
CPC ........... *B23D 61/121* (2013.01); *B23D 65/00* (2013.01); *Y10T 83/9348* (2015.04)

(58) Field of Classification Search
CPC .... B23D 61/121; B23D 65/00; Y10T 83/9348
(Continued)

(56) References Cited

U.S. PATENT DOCUMENTS 2,568,870 A * 9/1951 Ronan .................. B23D 61/121
83/846
3,292,674 A * 12/1966 Turner ................. B23D 61/121
407/120
(Continued)

FOREIGN PATENT DOCUMENTS

JP        2004-195609        7/2004
JP        2004195609    *    7/2004
(Continued)

OTHER PUBLICATIONS

Search report from Japan, dated Aug. 6, 2013.

*Primary Examiner* — Ghassem Alie
*Assistant Examiner* — Bharat C Patel
(74) *Attorney, Agent, or Firm* — Greenblum & Bernstein, P.L.C.

(57) ABSTRACT

A saw blade includes a group A (group A1 [=straight tooth+the odd number of set teeth]+group A2 [=straight tooth+the even number of set teeth]) and a group B (group B1 [=straight tooth+the odd number of set teeth having opposite set-bending sides to those in the group A1]+group B2 [=straight tooth+the even number of set teeth having opposite set-bending sides to those in the group A2]). Wide and narrow set teeth are arranged so that a max/min ratio of the number of pitches between the narrow set teeth having identical set-bending side and set width is 1.8 or less, and a max/min ratio of the number of pitches between the wide set (Continued)

teeth having identical set-bending side set width is 2.7 or less.

10 Claims, 5 Drawing Sheets

(51) Int. Cl.
    *B26F 1/24*     (2006.01)
    *B23D 61/12*     (2006.01)
    *B23D 65/00*     (2006.01)

(58) Field of Classification Search
    USPC ............... 83/835–855, 660, 698.61, 825
    See application file for complete search history.

(56) References Cited

U.S. PATENT DOCUMENTS

| | | | | |
|---|---|---|---|---|
| 4,179,967 A * | 12/1979 | Clark | ............... | B23D 61/12 83/661 |
| RE31,433 E * | 11/1983 | Clark | ............... | B23D 61/12 502/215 |
| 4,557,172 A * | 12/1985 | Yoneda | ............... | B23D 61/121 83/848 |
| 4,802,396 A * | 2/1989 | Kuklinski | ............... | B23D 61/121 83/835 |
| 4,813,324 A * | 3/1989 | Yoshida | ............... | B23D 61/121 83/848 |
| 5,094,135 A * | 3/1992 | Nakahara | ............... | B23D 61/021 83/847 |
| 5,803,678 A | 9/1998 | Korb et al. | | |
| 5,918,525 A * | 7/1999 | Schramm | ............... | B23D 61/121 83/835 |
| 6,003,422 A * | 12/1999 | Holston | ............... | B23D 61/121 83/661 |
| 6,158,324 A * | 12/2000 | Kullmann | ............... | B23D 61/021 408/206 |
| 6,276,248 B1 * | 8/2001 | Cranna | ............... | B23D 61/121 83/846 |
| 6,439,094 B1 * | 8/2002 | Yoneda | ............... | B23D 61/021 76/112 |
| 6,532,852 B1 * | 3/2003 | Tsujimoto | ............... | B23D 61/121 83/661 |
| 7,036,415 B2 * | 5/2006 | Tsujimoto | ............... | B23D 61/121 83/661 |
| 7,225,714 B2 * | 6/2007 | Rompel | ............... | B23D 61/121 76/112 |
| 7,806,033 B2 * | 10/2010 | Kocher | ............... | B23D 61/121 83/835 |
| 9,038,512 B2 * | 5/2015 | Horiguchi | ............... | 76/50.2 |
| 9,199,321 B2 * | 12/2015 | Novak | ............... | B23D 61/121 |
| 2002/0184981 A1 * | 12/2002 | Tsujimoto | ............... | B23D 55/088 83/13 |
| 2002/0184988 A1 * | 12/2002 | Rohman | ............... | B23D 61/123 83/835 |
| 2003/0010179 A1 * | 1/2003 | McLuen | ............... | B23D 61/128 83/848 |
| 2004/0035282 A1 * | 2/2004 | Tsujimoto | ............... | B23D 61/021 83/849 |
| 2004/0255749 A1 * | 12/2004 | Hayden, Sr. | ......... | B23D 61/121 83/788 |
| 2005/0211046 A1 * | 9/2005 | Thomas | ............... | B23D 61/121 83/855 |
| 2005/0257660 A1 * | 11/2005 | Hayden | ............... | B23D 61/121 83/846 |
| 2006/0162526 A1 * | 7/2006 | Nagano | ............... | B23D 61/121 83/835 |
| 2007/0251372 A1 * | 11/2007 | Petts | ............... | B23D 61/021 83/846 |
| 2008/0307936 A1 * | 12/2008 | Elliston | ............... | B23D 61/121 83/13 |
| 2011/0154970 A1 * | 6/2011 | Oshibe | ............... | B23D 61/121 83/835 |
| 2011/0271815 A1 * | 11/2011 | Elliston | ............... | B23D 61/121 83/835 |
| 2013/0032014 A1 | 2/2013 | Elliston et al. | | |
| 2013/0180375 A1 * | 7/2013 | Rearick | ............... | B23D 61/121 83/849 |

FOREIGN PATENT DOCUMENTS

| | | |
|---|---|---|
| JP | 2005-305639 | 11/2005 |
| JP | 2006-150486 | 6/2006 |
| JP | 4301806 | 5/2009 |
| JP | 2010-528892 | 8/2010 |
| WO | 2008/154591 | 12/2008 |

\* cited by examiner

FIG. 5 -PRIOR ART-

SAW BLADE AND METHOD FOR ARRANGING SAW TEETH

TECHNICAL FIELD

The present invention relates to a saw blade, and to a method for arranging saw teeth.

BACKGROUND ART

A band saw machine is used extensively for cutting a workpiece made of metal. As a cutting tool of a band saw blade, used is a Bi-Metal saw blade made by attaching teeth made of high speed steel, cemented carbide and so on to a blade body made of high ductility spring steel.

In addition, also used is a variable-pitch saw blade, in which pitches of its teeth are varied in order to reduce cutting noises. Further, also used in practical is a saw blade with kerf dispersed type tooth profile, which makes cut chips fine by making a set width wider as a tooth height (a length from a reference position to a tooth tip) becomes lower.

A band saw machine is also used for cutting a structural steel such as an I-beam. Especially, when cutting a large structural steel, there may be a case where cutting becomes impossible because a cut slit becomes narrow during cutting and then a saw blade gets stuck in the structural steel.

In order to prevent such a problem, a saw blade that makes a width of a cut slit wider by setting a set width wider is used in practice. In addition, there may be a case where cut surfaces become rough when a set width is wide (especially, cut surfaces become significantly rough when a set width reaches almost a half of a blade thickness). In order to improve such a disadvantage, there exists a saw blade having two types of set widths, narrow and wide.

As a saw blade with kerf dispersed type tooth profile mentioned above, there is a saw blade that was made by the present applicant and disclosed in a Patent Document 1 (Japanese Granted Patent No. 4301806) listed below.

FIG. 5(a) to FIG. 5(c) shows a saw blade 29 disclosed in the third embodiment of the Patent Document 1. As shown in FIG. 5(a) and FIG. 5(b), the saw blade 29 has, successively from right, a first group 33(A1) composed of a straight tooth S1 and three (the odd number of) set teeth, and a second group 31(A2) composed of a straight tooth S2 and two (the even number of) set teeth. In addition, a main group 35(A) is configured of the first group 33(A1) and the second group 31(A2). Further, a main group 35(B) composed of a first group 33(B1) and a second group 31(B2) comes next to the main group 35(A). Set-bending sides (R-side or L-side) of the teeth in the main group 35(B) are made opposite to set-bending sides of the teeth in the main group 35(A), respectively. In this manner, it is configured by arranging the main group 35(A) and the main group 35(B) alternately and repeatedly.

In addition, tooth heights of all the teeth in the first group 33 are almost identical (Hi). Similarly, tooth heights of all the teeth in the second group 31 are almost identical (Lo). In FIG. 5(b), Hi means that a tooth height is high, and Lo means that a tooth height is low.

In addition, Lw or Rw is a wide set tooth, and Ln or Rn is a narrow set tooth. For example, Rw1, Rw2 and Rw3 are set teeth all are bent to an identical side and have an identical width, and perceived as identically-functional teeth.

PRIOR ART DOCUMENT

Patent Document

Patent Document 1: Japanese Granted Patent No. 4301806

SUMMARY OF INVENTION

And now, one tooth exists between Rw1 and Rw2, five teeth exists between Rw2 and Rw3, and five teeth similarly exists between Rw3 and the next Rw1 (not shown). Namely, as shown in FIG. 5(b), Rw1 and Rw2 are distanced from each other by two pitches, Rw2 and Rw3 are distanced from each other by six pitches, and Rw3 and the next Rw1 are distanced from each other by six pitches.

Therefore, a cut amount by Rw1 and Rw3 becomes almost three times as large as a cut amount by Rw2. Here, the reason for using the expression "almost" is because it doesn't become precisely triplicated in a case of variable pitches.

The fact that the cut amounts are three times different means that cutting loads are three times different. Namely, Rw1 and Rw3 are abraded away more than Rw2. Although small difference of the abrasions is acceptable, a triplicated cutting load is too large in extent. Much the same is true on Lw1, Lw2 and Lw3 that are identically-functional teeth.

An object of the present invention is to provide a saw blade and a method for arranging saw teeth that can reduce cutting noises and can make set teeth abraded evenly.

A first aspect of the present invention provides a saw blade including straight teeth and set teeth whose set-bending sides are set to L-side or R-side and whose set widths are set to wide or narrow, the blade comprising: a group A that is composed of, successively from a cutting leading side, a group A1 that is composed of a straight tooth and the odd number of set teeth, and a group A2 that comes next to the group A1 and is composed of a straight tooth and the even number of set teeth, and a group B that comes next to the group A, and is composed of, successively from the cutting leading side, a group B1 that is composed of a straight tooth and the odd number of set teeth whose set-bending sides are made opposite to those of the set teeth in the group A1, and a group B2 that comes next to the group B1 and is composed of a straight tooth and the even number of set teeth whose set-bending sides are made opposite to those of the set teeth in the group A2, wherein the group A and the group B are arranged alternately and repeatedly, and wide set teeth and narrow set teeth are arranged so that a ratio of a maximum value to a minimum value of the number of pitches between the narrow set teeth having an identical set-bending side and an identical set width is 1.8 or less, and a ratio of a maximum value to a minimum value of the number of pitches between the wide set teeth having an identical set-bending side and an identical set width is 2.7 or less.

Here, it is preferable that each of the group A1 and the group B1 includes three set teeth, and each of the group A2 and the group B2 includes two set teeth.

Further, it is preferable that, when straight teeth are denoted by Si, L-side wide set teeth are denoted by Lwi, R-side wide set teeth are denoted by Rwi, L-side narrow set teeth are denoted by Lni, and R-side narrow set teeth are denoted by Rni (i=1, 2, 3 . . . ), arrangements of saw teeth, successively from the cutting leading side, in the group A and the group B are set to one of following (1) to (4).
  (1) Group A: S1, Lw1, Rw1, Ln1, S2, Rn1, Lw2
      Group B: S3, Rw2, Lw3, Rn2, S4, Ln2, Rw3
  (2) Group A: S1, Lw1, Rni, Ln1, S2, Rw1, Lw2
      Group B: S3, Rw2, Ln2, Rn2, S4, Lw3, Rw3
  (3) Group A: S1, Ln1, Rn1, Lw1, S2, Rw1, Lw2
      Group B: S3, Rn2, Ln2, Rw2, S4, Lw3, Rw3
  (4) Group A: S1, Rn1, Lw1, Rw1, S2, Lw2, Rn2
      Group B: S3, Ln1, Rw2, Lw3, S4, Rw3, Ln2

A second aspect of the present invention provides a saw blade including straight teeth and set teeth whose set-bending sides are set to L-side or R-side and whose set widths are set to wide or narrow, the blade comprising: a group A that is composed of, successively from a cutting leading side, a group A1 that is composed of a straight tooth and the even number of set teeth, and a group A2 that comes next to the group A1 and is composed of a straight tooth and the odd number of set teeth, and a group B that comes next to the group A, and is composed of, successively from the cutting leading side, a group B1 that is composed of a straight tooth and the even number of set teeth whose set-bending sides are made opposite to those of the set teeth in the group A1, and a group B2 that comes next to the group B1 and is composed of a straight tooth and the odd number of set teeth whose set-bending sides are made opposite to those of the set teeth in the group A2, wherein the group A and the group B are arranged alternately and repeatedly, and wide set teeth and narrow set teeth are arranged so that a ratio of a maximum value to a minimum value of the number of pitches between the narrow set teeth having an identical set-bending side and an identical set width is 1.8 or less, and a ratio of a maximum value to a minimum value of the number of pitches between the wide set teeth having an identical set-bending side and an identical set width is 2.7 or less.

Here, it is preferable that each of the group A1 and the group B1 includes four set teeth, and each of the group A2 and the group B2 includes three set teeth.

Further, it is preferable that, when straight teeth are denoted by Si, L-side wide set teeth are denoted by Lwi, R-side wide set teeth are denoted by Rwi, L-side narrow set teeth are denoted by Lni, and R-side narrow set teeth are denoted by Rni (i=1, 2, 3 . . . ), arrangements of saw teeth, successively from the cutting leading side, in the group A and the group B are set to one of following (1) to (3).
  (1) Group A: S1, Ln1, Rn1, Lw1, Rw1, S2, Ln2, Rw2, Lw2
      Group B: S3, Rn2, Ln3, Rw3, Lw3, S4, Rn3, Lw4, Rw4
  (2) Group A: S1, Ln1, Rw1, Lw1, Rn1, S2, Ln2, Rw2, Lw2
      Group B: S3, Rn2, Lw3, Rw3, Ln3, S4, Rn3, Lw4, Rw4
  (3) Group A: S1, Lw1, Rw1, Ln1, Rn1, S2, Lw2, Rw2, Ln2
      Group B: S3, Rw3, Lw3, Rn2, Ln2, Ln3, S4, Rw4, Lw4, Rn3

A third aspect of the present invention provides a method for arranging saw teeth in a saw blade including straight teeth and set teeth, the method comprising: with respect to the set teeth, setting set-bending sides thereof to L-side or R-side, and setting set widths thereof to wide or narrow, arranging a group A that is composed of, successively from a cutting leading side, a group A1 that is composed of a straight tooth and the odd number of set teeth, and a group A2 that comes next to the group A1 and is composed of a straight tooth and the even number of set teeth, arranging a group B that comes next to the group A and is composed of, successively from the cutting leading side, a group B1 that is composed of a straight tooth and set teeth the odd number of set teeth whose set-bending sides are made opposite to those of the set teeth in the group A1, and a group B2 that comes next to the group B1 and is composed of a straight tooth and the even number of set teeth whose set-bending sides are made opposite to those of the set teeth in the group A2, arranging the group A and the group B alternately and repeatedly, and arranging wide set teeth and narrow set teeth so that a ratio of a maximum value to a minimum value of the number of pitches between the narrow set teeth having an identical set-bending side and an identical set width is 1.8 or less, and a ratio of a maximum value to a minimum value of the number of pitches between the wide set teeth having an identical set-bending side and an identical set width is 2.7 or less.

Here, it is preferable that each of the group A1 and the group B1 includes three set teeth, and each of the group A2 and the group B2 includes two set teeth.

Further, it is preferable that, when straight teeth are denoted by Si, L-side wide set teeth are denoted by Lwi, R-side wide set teeth are denoted by Rwi, L-side narrow set teeth are denoted by Lni, and R-side narrow set teeth are denoted by Rni (i=1, 2, 3 . . . ), arrangements of saw teeth, successively from the cutting leading side, in the group A and the group B are set to one of following (1) to (4).
  (1) Group A: S1, Lw1, Rw1, Ln1, S2, Rn1, Lw2
      Group B: S3, Rw2, Lw3, Rn2, S4, Ln2, Rw3
  (2) Group A: S1, Lw1, Rn1, Ln1, S2, Rw1, Lw2
      Group B: S3, Rw2, Ln2, Rn2, S4, Lw3, Rw3
  (3) Group A: S1, Ln1, Rn1, Lw1, S2, Rw1, Lw2
      Group B: S3, Rn2, Ln2, Rw2, S4, Lw3, Rw3
  (4) Group A: S1, Rn1, Lw1, Rw1, S2, Lw2, Rn2
      Group B: S3, Ln1, Rw2, Lw3, S4, Rw3, Ln2

A fourth aspect of the present invention provides a method for arranging saw teeth in a saw blade including straight teeth and set teeth, the method comprising: with respect to the set teeth, setting set-bending sides thereof to L-side or R-side, and setting set widths thereof to wide or narrow, arranging a group A that is composed of, successively from a cutting leading side, a group A1 that is composed of a straight tooth and the even number of set teeth, and a group A2 that comes next to the group A1 and is composed of a straight tooth and the odd number of set teeth, arranging a group B that comes next to the group A and is composed of, successively from the cutting leading side, a group B1 that is composed of a straight tooth and set teeth the even number of set teeth whose set-bending sides are made opposite to those of the set teeth in the group A1, and a group B2 that comes next to the group B1 and is composed of a straight tooth and the odd number of set teeth whose set-bending sides are made opposite to those of the set teeth in the group A2, arranging the group A and the group B alternately and repeatedly, and arranging wide set teeth and narrow set teeth so that a ratio of a maximum value to a minimum value of the number of pitches between the narrow set teeth having an identical set-bending side and an identical set width is 1.8 or less, and a ratio of a maximum value to a minimum value of the number of pitches between the wide set teeth having an identical set-bending side and an identical set width is 2.7 or less.

Here, it is preferable that each of the group A1 and the group B1 includes four set teeth, and each of the group A2 and the group B2 includes three set teeth.

Further, it is preferable that when straight teeth are denoted by Si, L-side wide set teeth are denoted by Lwi, R-side wide set teeth are denoted by Rwi, L-side narrow set teeth are denoted by Lni, and R-side narrow set teeth are denoted by Rni (i=1, 2, 3 . . . ), arrangements of saw teeth, successively from the cutting leading side, in the group A and the group B are set to one of following (1) to (3).

(1) Group A: S1, Ln1, Rn1, Lw1, Rw1, S2, Ln2, Rw2, Lw2
  Group B: S3, Rn2, Ln3, Rw3, Lw3, S4, Rn3, Lw4, Rw4
(2) Group A: S1, Ln1, Rw1, Lw1, Rn1, S2, Ln2, Rw2, Lw2
  Group B: S3, Rn2, Lw3, Rw3, Ln3, S4, Rn3, Lw4, Rw4
(3) Group A: S1, Lw1, Rw1, Ln1, Rn1, S2, Lw2, Rw2, Ln2
  Group B: S3, Rw3, Lw3, Rn2, Ln3, S4, Rw4, Lw4, Rn3

According to any one of the above first to fourth aspects, based on the number of pitches of identically-functional teeth in the set teeth, cutting loads can be made uniform, cutting noises can be reduces, and abrasions can be made even, as a result, lifetime of the saw blade can be improved.

DESCRIPTION OF EMBODIMENTS

Hereinafter, embodiments of a saw blade (method for arranging saw teeth) will be explained with reference to the drawings.

Figure 1:
FIG. 1 It shows ten types (No. 1 to No. 10) of saw blades selected for an experiment; (a) is plan views, and (b) is a side view.

Each of ten types of saw blades (No. 1 to No. 10) shown in FIG. 1(a) to FIG. 1(b) includes straight saw teeth S1-S4, L-side wide set teeth Lw, R-side wide set teeth Rw, L-side narrow set teeth Ln, and R-side narrow set teeth Rn. Here, a wide set tooth is a set tooth whose set width is set wide, a narrow set tooth is a set tooth whose set width is set narrow. Each of the saw blades includes, when seen along its travelling direction (in the figure, in an order from a right side/in an order from a cutting leading side), a group A (seven teeth) composed of a group A1 (four teeth) that is composed of a straight tooth S1 and three (or the odd number of) set teeth, and a group A2 (three teeth) that comes next to the group A1 and is composed of a straight tooth S2 and two (or the even number of) set teeth. In addition, each of the saw blades also includes, next to the group A, a group B (seven teeth) composed of a group B1 (four teeth) that is composed of a straight tooth S3 and three (or the odd number of) set teeth, and a group B2 (three teeth) that comes next to this group A1 and is composed of a straight tooth S4 and two (or the even number of) set teeth. Set-bending sides (R-side or L-side) of the teeth in the group B are set to opposite sides to set-bending sides of the teeth in the group A, respectively. Each of the saw blades is configured by arranging the group A and the group B alternately and repeatedly.

The ten types of saw blades (No. 1 to No. 10) for a cutting experiment are selected based on an after-explained arrangement pattern condition in order to determine an optimal arrangement(s) for an arrangement(s) of identically-functional teeth.

When selecting the saw blades (No. 1 to No. 10), arrangements of wide set teeth and narrow set teeth will be considered first. The number of set teeth having an identical set-bending side and an identical width on one side should be made equal to that on another side in view of balance of set teeth on both sides (R-side and L-side), but a ratio of the number of wide set teeth to the number of narrow set teeth is selectable.

Since the number of set teeth in the group B is equal to the number of set teeth in the group A and the set teeth in the group B have opposite set-bending sides to those of the set teeth in the group A, respectively, the balance can be achieved by only determining the group A.

The group A includes seven teeth in total, two straight teeth and five set teeth. Here, four ways shown below are conceivable for a ratio of the number of wide set teeth to the number of narrow set teeth in five set teeth.

1. Wide set teeth, Narrow set teeth, Narrow set teeth, Narrow set teeth, Narrow set teeth (Wide 4: Narrow 1)
2. Wide set teeth, Wide set teeth, Narrow set teeth, Narrow set teeth, Narrow set teeth (Wide 3: Narrow 2)
3. Wide set teeth, Wide set teeth, Wide set teeth, Narrow set teeth, Narrow set teeth (Wide 2: Narrow 3)
4. Wide set teeth, Wide set teeth, Wide set teeth, Wide set teeth, Narrow set teeth (Wide 1: Narrow 4)

Wide set teeth form cut surfaces, and thereby cut surfaces become finer when the number thereof increases. However, the more wide set teeth become, the less narrow set teeth become, and thereby lifetime of a saw blade may be shortened due to an increase of cutting loads to the narrow set teeth. Therefore, a combination that equalizes cutting loads applied to teeth as much as possible is good.

Kerf of straight teeth overlaps that of narrow set teeth at a large proportion, so that it is considered that similar cutting loads apply to the straight teeth and the narrow set teeth. In a case of adopting a combination of three wide set teeth and two narrow set teeth, two straight teeth reduce loads to the narrow set teeth and thereby the best balance of cutting loads can be achieved. Therefore, the combination of three wide set teeth and two narrow set teeth is selected.

Next, arrangements of R-side and L-side set teeth will be considered.

Arrangements (orders) for the group A including an L-side narrow set tooth Ln=1, an R-side narrow set tooth Rn=1, an R-side wide set tooth Rw=1, and L-side wide set teeth Lw=2 is considered first. Since set-bending sides are opposite to each other with respect to the group A and the group B as explained above, the consideration for the arrangements (orders) including an L-side narrow set tooth Ln=1, an R-side narrow set tooth Rn=1, an R-side wide set tooth Rw=1, and L-side wide set teeth Lw=2 is equivalent to a consideration for arrangements (orders) including an R-side narrow set tooth Rn=1, an L-side narrow set tooth Rn=1, an L-side wide set tooth Lw=1, and R-side wide set teeth Rw=2 whose set-bending sides are opposite.

A [Table 1] shows all the arrangements (orders) for the group A including Ln=1, Rn=1, Rw=1, and Lw=2. There are sixty ways in total for the arrangements (orders). Among these arrangements, an arrangement(s) in which set teeth having an identical set-bending side are aligned successively to each other or aligned successively with a straight tooth interposed therebetween should be avoided, because cutting loads are not balanced.

Therefor, as favorable arrangements (orders) of set teeth, arrangements (orders) in which set teeth having an identical set-bending side are not aligned successively to each other or not aligned successively even with a straight tooth interposed therebetween are selected. The arrangements in which set teeth having an identical set-bending side are not aligned successively to each other are marked with "G" (Good) in a column "Judgment of successive set teeth" of the [Table 1]. Similarly, the arrangements in which set teeth having an identical set-bending side are not aligned successively even with a straight tooth interposed therebetween are marked with "G" in a column "Judgment of pre- & post-position of straight tooth" of the [Table 1]. Namely, Nos. 7, 12, 13, 18, 56, and 59 each has "G" in both of the judgments are selected as favorable arrangements (orders) of set teeth, and thereby marked with "G" in a column "Judgment of selected pattern" in the [Table 1].

Next, arrangements (orders) for the group A including Rn=2, Rw=1, and Lw=2 will be considered. A [Table 2] shows all the arrangements (orders) for the group A including Rn=2, Rw=1, and Lw=2. There are thirty ways in total for the arrangements (orders). Similarly, Nos. 14, 21, and 23 are selected as favorable arrangements (orders) of set teeth.

Further, arrangements (orders) for the group A including Ln=2, Rw=1, and Lw=2 will be considered. A [Table 3] shows all the arrangements (orders) for the group A including Ln=2, Rw=1, and Lw=2. There are thirty ways in total for the arrangements (orders). Selection of favorable arrangements (orders) of set teeth is tried similarly, but no arrangement satisfies the condition.

Sequentially, arrangements (orders) for the group A including Rn=1, Ln=1, and Lw=3 will be considered. A [Table 4] shows all the arrangements (orders) for the group A including Rn=1, Ln=1, and Lw=3. There are twenty ways in total for the arrangements (orders). Also in this case, no arrangement satisfies the condition.

Further sequentially, arrangements (orders) for the group A including Rn=2, and Lw=3 will be considered. A [Table 5] shows all the arrangements (orders) for the group A including Rn=2, and Lw=3. There are ten ways in total for the arrangements (orders). Similarly, No. 5 is selected as a favorable arrangement (order) of set teeth.

A [Table 6-1] shows the favorable arrangements (orders) of set teeth selected in the [Table 1] to the [Table 5]. In addition, a [Table 6-2] shows "the number of pitches between identical functional teeth" and "a ratio of a maximum value to a minimum value of the number of pitches (cutting load)". Note that Nos. 7, 12, 13, 18, 56 and 59 in the [Table 1], Nos. 14, 21 and 23 in the [Table 2], and the No. 5 in the [Table 5] are newly renumbered as No. 1 to No. 10 in the [Table 6-1] and the [Table 6-2]. These No. 1 to No. 10 are the saw blades shown in FIG. 1(a).

In order to select an optimal arrangement(s) among the arrangements (orders) shown in the [Table 6-1] and the [Table 6-2], a comparison experiment is made with respect to cutting noises and tooth-tip abrasions. Note that the saw blades shown in FIG. 1, i.e. the newly renumbered No. 1 to No. 10 in the [Table 6-1] and the [Table 6-2] are used in the experiment.

Experiment conditions are shown below.
Cutting machine: Horizontal Band Saw Machine Type. HA-400 manufactured by Amada Co., Ltd.
Material to be cut: SKD61(JIS), ϕ250
Saw blade: Band width 41 mm, Band thickness 1.3 mm, Band length 4570 mm, Saw tooth pitches 2/3
Cutting condition: Rotational speed of saw blade 30 m/min, Cutting time 24.5 minutes (cutting ratio 20 $cm^2$/min)

The materials are cut thirty times under the cutting condition, and thereby cutting noise during cutting a portion near the center of the 30th material is measured and a tooth-tip abrasion loss of each set teeth of the saw blade is measured after the 30th cutting.

In order to evaluate a uniform degree of each tooth, the abrasion loss is measured by separating wide set teeth and narrow set teeth of fourteen teeth included in the group A (seven teeth) and the group B (seven teeth) and then measuring the abrasion losses of a maximum load tooth and a minimum load tooth with respect to each of the wide and narrow set teeth. Note that an averaged value of the L-side and R-side set teeth with the same load (the maximum load or the minimum load) is used as the abrasion loss. A [Table 7] shows teeth used in calculating averaged values for each of the saw blades (No. 1 to No. 10) used for the experiment.

Figure 2:
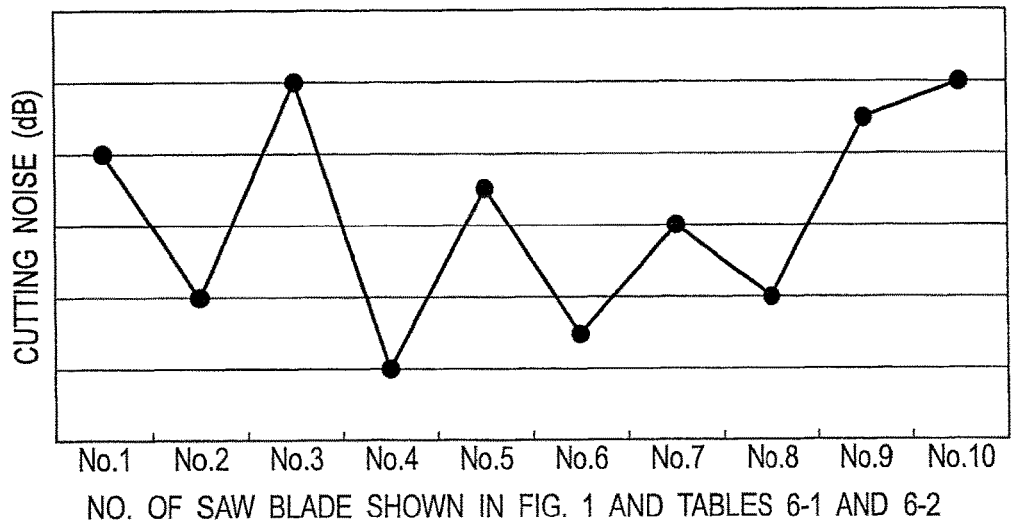
FIG. 2 It is a graph comparing cutting noises in the experiment.

FIG. 2 is a graph showing the measurement results of the cutting noises. It is known from this graph that the cutting noises of Nos. 2, 4, 6 and 8 are extremely lower than others.

Figure 3:
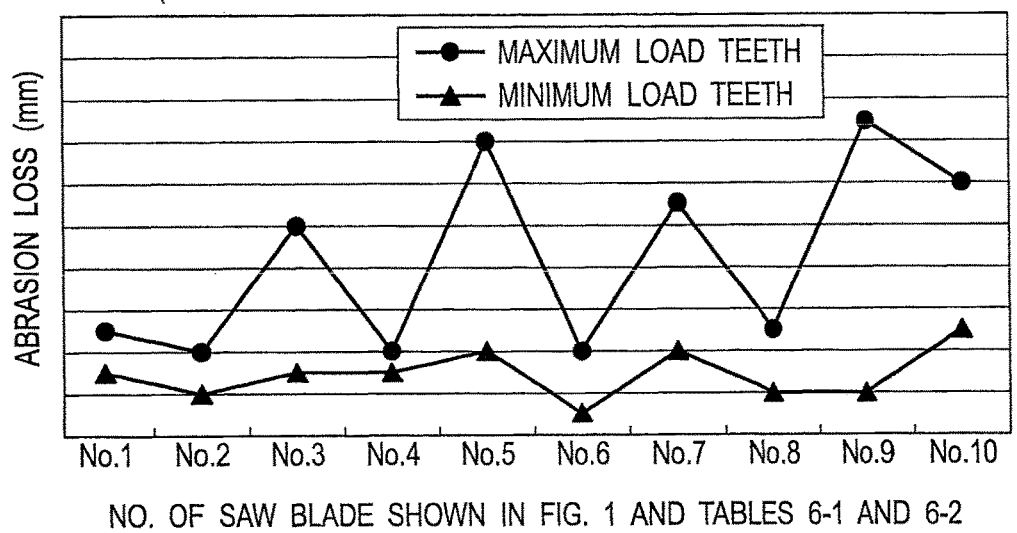
FIG. 3 It is a graph comparing abrasion losses of narrow set teeth (average values of L-side and R-side set teeth).

FIG. 3 is a graph showing the measurement results of the tooth-tip abrasion losses of the narrow set teeth (the averaged values of the L-side and R-side set teeth). It is known from this graph that differences of the tooth-tip abrasion losses (difference(s) between the abrasion losses of the maximum-load tooth and the minimum-load tooth) of Nos. 1, 2, 4, 6 and 8 are smaller than others and the abrasion losses thereof are made uniform.

Figure 4:
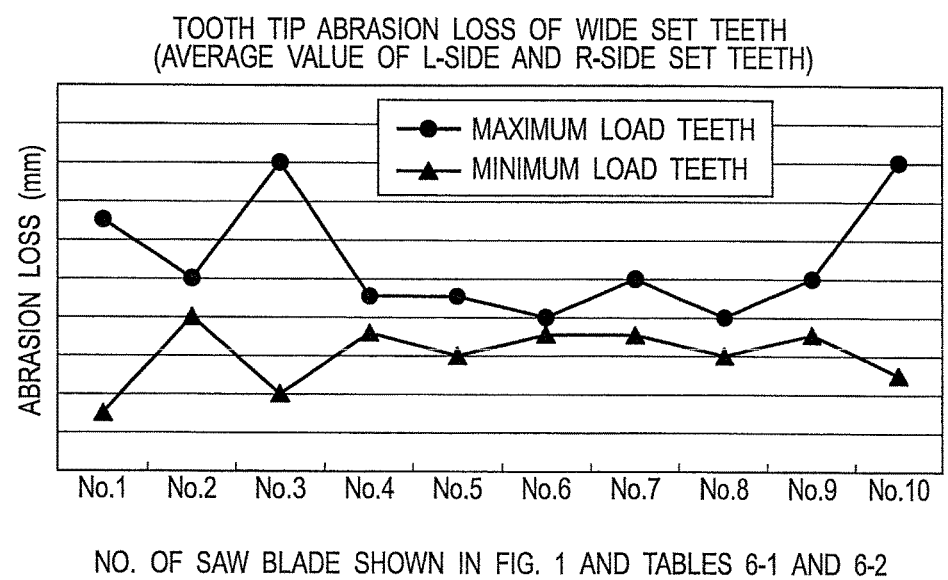
FIG. 4 It is a graph comparing abrasion losses of wide set teeth (average values of L-side and R-side set teeth).
Figure 5:
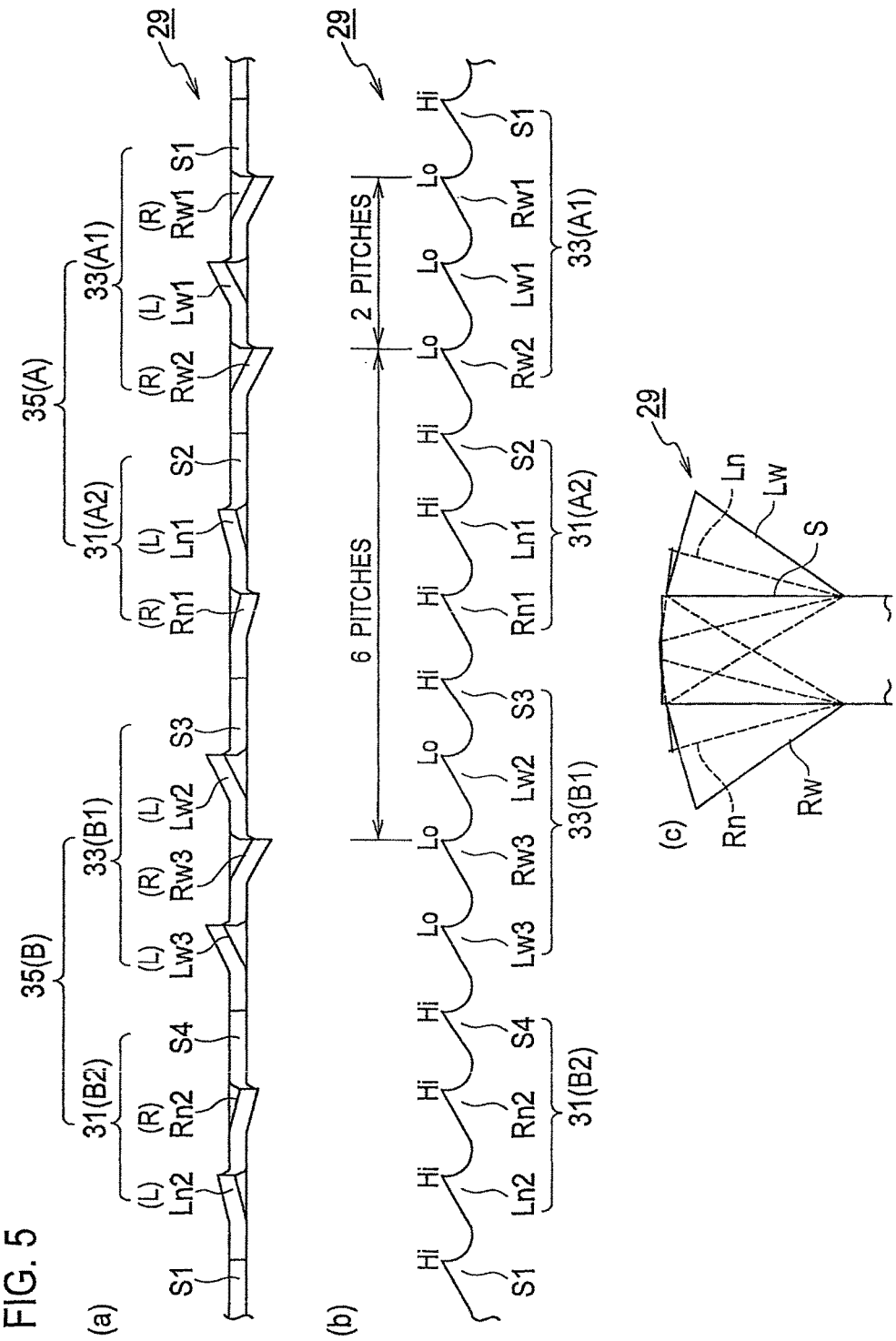
FIG. 5 It shows a prior-art saw blade; (a) is a plan view, (b) is a side view, and (c) is a front view.

FIG. 4 is a graph showing the measurement results of the tooth-tip abrasion losses of the wide set teeth (the averaged values of the L-side and R-side set teeth). It is known from this graph that differences of the tooth-tip abrasion losses (difference(s) between the abrasion losses of the maximum-load tooth and the minimum-load tooth) of Nos. 2, 4, 5, 6, 7, 8 and 9 are smaller than others and the abrasion losses thereof are made uniform.

As obvious from the above, Nos. 2, 4, 6 and 8 have the low cutting noises and the uniform tooth-tip abrasion losses. It can be concluded that the set teeth are arranged optimally in these saw blades.

Here, it will be considered why the saw blades of Nos. 2, 4, 6 and 8 get good result.

In the [Table 6-2], the number of pitches between the identically-functional teeth in No. 1 to No. 10 is shown. For example, referring to the [Table 6-1] or FIG. 1, with respect to Rw1~Rw2 in No. 1, Lw2, S2, Rn1, Ln1, S3 and Rw2 are arranged successively after Rw1, so that there are five teeth between Rw1 and Rw2. Namely, the number of pitches between Rw1 and Rw2 is 5+1=6.

Similarly, with respect to Rw2-Rw3 in No. 1, Lw3 and Rw3 are arranged successively after Rw2, so that there is one tooth between Rw2 and Rw3. Namely, the number of pitches between Rw2 and Rw3 is 1+1=2.

The above-explained number of pitches "6" between teeth represents a cutting load applied to Rw2 and the number of pitches "2" represents a cutting load applied to Rw3, and it is indicated that the larger the number becomes, the larger a load is.

Although the number of pitches of both of the L-side set teeth and the R-side set teeth are shown in the [Table 6-2], a ratio(s) of a minimum value to a maximum value of the number of pitches (cutting load) becomes identical with respect to the L-side set teeth and the R-side set teeth. Therefore, it's sufficient to calculate a ratio(s) only with respect to one of them. Here, the ratio(s) will be calculated by taking the R-side set teeth as an example.

Three R-side wide set teeth (Rw1~)Rw2, (Rw2~)Rw3 and (Rw3~)Rw1 are included in No. 1. The number of pitches (cutting load) is Rw2=6, Rw3=2 and Rw1=6. Therefore, the ratio of the maximum value to the minimum value of the number of pitches (cutting load) is 6/2=3.0.

Namely, each cut amount by Rw1 and Rw2 becomes almost three times as large as a cut amount by Rw3, so that each cutting load of Rw1 and Rw2 becomes almost three times as large as a cutting load of Rw3. Here, the reason for using the expression "almost" is because it doesn't become triplicated precisely in a case of variable pitches.

Similarly, two R-side narrow set teeth (Rn1~)Rn2 and (Rn2~)Rn1 are included in No. 1. The number of pitches (cutting load) is Rn2=8 and Rn1=6. Therefore, the ratio of the maximum value to the minimum value of the number of pitches (cutting load) is 8/6=1.3.

The [Table 6-2] also shows the ratio(s) of the maximum value to the minimum value of the number of pitches with respect to the narrow set teeth and the wide set teeth in addition to the number of pitches (cutting load) of each of the saw blades (No. 1 to No. 10).

As explained above (see FIG. 3), the saw blades with a good tooth-tip abrasion loss of the narrow set teeth are Nos. 1, 2, 4, 6 and 8. Referring to the [Table 6-2], the ratios of the maximum value to the minimum value of the number of pitches (cutting load) with respect to the narrow set teeth in Nos. 1, 2, 4, 6 and 8 are commonly 1.8 or less.

In addition, as explained above (see FIG. 4), the saw blades with a good tooth-tip abrasion loss of the wide set teeth are Nos. 2, 4, 5, 6, 7, 8 and 9. Referring to the [Table 6-2], the ratios of the maximum value to the minimum value of the number of pitches (cutting load) with respect to the wide set teeth in Nos. 2, 4, 5, 6, 7, 8 and 9 are commonly 2.7 or less.

Further, as explained above (see FIG. 2), the saw blades with a good cutting noise are Nos. 2, 4, 6 and 8. Referring to the [Table 6-2], in the Nos. 2, 4, 6, and 8, the ratios of the maximum value to the minimum value of the number of pitches (cutting load) with respect to the narrow set teeth are commonly 1.8 or less, and the ratios of the maximum value to the minimum value of the number of pitches (cutting load) with respect to the wide set teeth are commonly 2.7 or less.

It can be concluded that cutting noises can be reduced and saw teeth can be abraded evenly by arranging the saw teeth so that the number of pitches (cutting load) of identically-functional teeth is made unbiased as much as possible, like the saw blades Nos. 2, 4, 6 and 8.

Each of the saw blade No. 1 to No. 10 shown in the above-explained [Table 6-1] (FIG. 1(a)) includes the group A composed of the group A1 that is composed of a straight tooth and three (or the odd number of) set teeth and the group A2 that comes next to the group A1 and is composed of a straight tooth and two (or the even number of) set teeth, and the group B that is comes next to the group A and includes set teeth whose set-bending sides are made opposite to those of the teeth in the group A. Compared to this, a [Table 8-1] and a [Table 8-2] show saw blades each composed of a group A1 that is composed of a straight tooth and four (or the even number of) set teeth and a group A2 that comes next to the group A1 and is composed of a straight tooth and three (or the odd number of) set teeth, and a group B that is comes next to the group A and includes set teeth whose set-bending sides are made opposite to those of the teeth in the group A.

Namely, the group A1 has five saw teeth and the group A2 has four sow teeth, so that the group A has nine saw teeth. The group B has the same number of saw teeth whose set-bending sides are made opposite. Each of the saw blades shown in the [Table 8-1] and the [Table 8-2] is configured of eighteen sow teeth in total, nine in the group A and nine in the group B. In addition, set teeth are composed of wide set teeth and narrow set teeth.

In the [Table 8-1] and the [Table 8-2], selected are arrangements (orders) in which set teeth having an identical set-bending side are not aligned successively to each other or not aligned successively even with a straight tooth interposed therebetween. As the arrangements of set teeth that are good in cutting noises and/or tooth-tip abrasions are selected, through the experiment, from the saw blades shown in the [Table 6-1], arrangements of set teeth that are good in cutting noises and/or tooth-tip abrasions are selected, through the same experiment, from those shown in the [Table 6-1] and thereby Nos. 5, 8 and 22 are selected. Note that, although the experiment results are omitted, "the number of pitches between identical functional teeth" and "a ratio of a maximum value to a minimum value of the number of pitches (cutting load)" of the selected arrangements (orders) are shown in a [Table 8-3] (but, shown with respect to only the R-side set teeth).

As shown in the [Table 8-3], the ratio of the maximum value to the minimum value of the number of pitches (cutting load) with respect to the narrow set teeth in No. 5 is 1.6, i.e. 1.8 or less. In addition, the ratio of the maximum value to the minimum value of the number of pitches (cutting load) with respect to the wide set teeth is 1.7, i.e. 2.7 or less.

In regard to No. 8, the ratio of the maximum value to the minimum value of the number of pitches (cutting load) with respect to the narrow set teeth is 1.4, i.e. 1.8 or less. In addition, the ratio of the maximum value to the minimum value of the number of pitches (cutting load) with respect to the wide set teeth is 1.7, i.e. 2.7 or less.

In regard to No. 22, the ratio of the maximum value to the minimum value of the number of pitches (cutting load) with respect to the narrow set teeth is 1.6, i.e. 1.8 or less. In addition, the ratio of the maximum value to the minimum value of the number of pitches (cutting load) with respect to the wide set teeth is 1.7, i.e. 2.7 or less.

Figure 6:
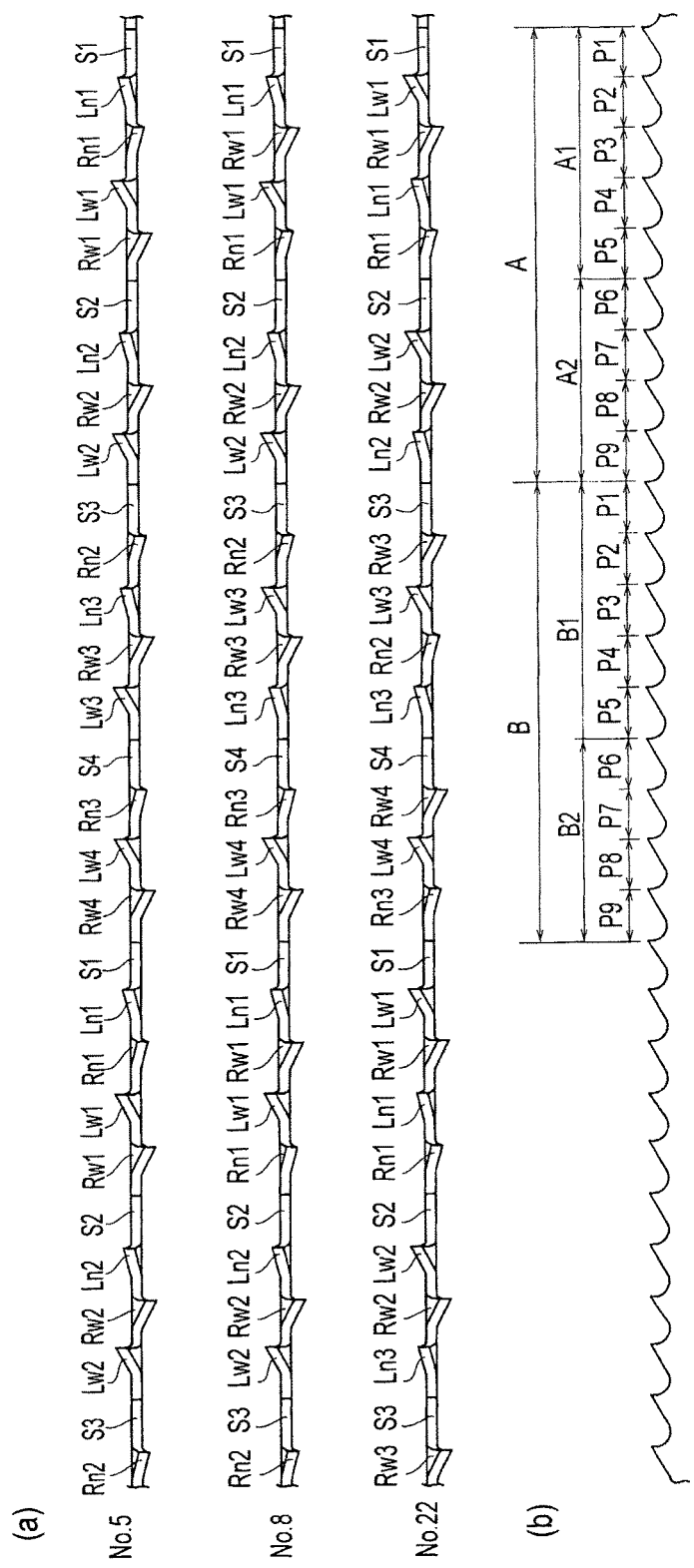
FIG. 6 It shows three types (Nos. 5, 8 and 22) of saw blades selected for an experiment; (a) is plan views, and (b) is a side view.

The above-mentioned saw blades of Nos. 7, 8 and 22 are shown in FIG. 6.

TABLE 1

TYPES AND NUMBER OF FUNCTIONAL TEETH IN GROUP A

| | | | | | Ln: 1 Rn: 1 Rw: 1 Lw: 2 TRAVEL DIRECTION OF SAW BLADE | | | | | | | | | | | JUDGMENT OF PRE- & POST- | JUDGMENT OF | JUDGMENT OF |
|---|---|---|---|---|---|---|---|---|---|---|---|---|---|---|---|---|---|---|
| | | | GROUP B | | | | | | | GROUP A | | | | | | POSITIONS OF | SUCCESSIVE | SELECTED |
| No. | 14 | 13 | 12 | 11 | 10 | 9 | 8 | 7 | 6 | 5 | 4 | 3 | 2 | 1 | (14) | STRAIGHT TOOTH | SET TEETH | PATTERN |
| 1 | Rn | Ln | S | Lw | Rw | Rw | S | Ln | Rn | S | Rw | Lw | Lw | S | (Rn) | | | |
| 2 | Ln | Rn | S | Lw | Rw | Rw | S | Rn | Ln | S | Rw | Lw | Lw | S | (Ln) | | | |
| 3 | Rn | Lw | S | Ln | Rw | Rw | S | Ln | Rw | S | Rn | Lw | Lw | S | (Rn) | | | |
| 4 | Lw | Rn | S | Ln | Rw | Rw | S | Rw | Ln | S | Rn | Lw | Lw | S | (Lw) | | | |
| 5 | Ln | Lw | S | Rn | Rw | Rw | S | Rn | Rw | S | Ln | Lw | Lw | S | (Ln) | | | |
| 6 | Lw | Ln | S | Rn | Rw | Rw | S | Rw | Rn | S | Ln | Lw | Lw | S | (Lw) | | | |

TABLE 1-continued

TYPES AND NUMBER OF FUNCTIONAL TEETH IN GROUP A

Ln: 1 Rn: 1 Rw: 1 Lw: 2

TRAVEL DIRECTION OF SAW BLADE

| | GROUP B | | | | | | | GROUP A | | | | | | | JUDGMENT OF PRE- & POST- POSITIONS OF | JUDGMENT OF SUCCESSIVE | JUDGMENT OF SELECTED |
|---|---|---|---|---|---|---|---|---|---|---|---|---|---|---|---|---|---|
| No. | 14 | 13 | 12 | 11 | 10 | 9 | 8 | 7 | 6 | 5 | 4 | 3 | 2 | 1 | (14) | STRAIGHT TOOTH | SET TEETH | PATTERN |
| 7 | Rn | Ln | S | Rw | Lw | Rw | S | Ln | Rn | S | Lw | Rw | Lw | S | (Rn) | G | G | G |
| 8 | Ln | Rn | S | Rw | Lw | Rw | S | Rn | Ln | S | Lw | Rw | Lw | S | (Ln) | | G | |
| 9 | Rn | Rw | S | Ln | Lw | Rw | S | Ln | Lw | S | Rn | Rw | Lw | S | (Rn) | G | | |
| 10 | Rw | Rn | S | Ln | Lw | Rw | S | Lw | Ln | S | Rn | Rw | Lw | S | (Rw) | G | | |
| 11 | Ln | Rw | S | Rn | Lw | Rw | S | Rn | Lw | S | Ln | Rw | Lw | S | (Ln) | | G | |
| 12 | Rw | Ln | S | Rn | Lw | Rw | S | Lw | Rn | S | Ln | Rw | Lw | S | (Rw) | G | G | G |
| 13 | Rn | Lw | S | Rw | Ln | Rw | S | Ln | Rw | S | Lw | Rn | Lw | S | (Rn) | G | G | G |
| 14 | Lw | Rn | S | Rw | Ln | Rw | S | Rw | Ln | S | Lw | Rn | Lw | S | (Lw) | | G | |
| 15 | Rn | Rw | S | Lw | Ln | Rw | S | Ln | Lw | S | Rw | Rn | Lw | S | (Rn) | G | | |
| 16 | Rw | Rn | S | Lw | Ln | Rw | S | Lw | Ln | S | Rw | Rn | Lw | S | (Rw) | G | | |
| 17 | Lw | Rw | S | Rn | Ln | Rw | S | Rw | Lw | S | Ln | Rn | Lw | S | (Lw) | | G | |
| 18 | Rw | Lw | S | Rn | Ln | Rw | S | Lw | Rw | S | Ln | Rn | Lw | S | (Rw) | G | G | G |
| 19 | Ln | Lw | S | Rw | Rn | Rw | S | Rn | Rw | S | Lw | Ln | Lw | S | (Ln) | | | |
| 20 | Lw | Ln | S | Rw | Rn | Rw | S | Rw | Rn | S | Lw | Ln | Lw | S | (Lw) | | | |
| 21 | Ln | Rw | S | Lw | Rn | Rw | S | Rn | Lw | S | Rw | Ln | Lw | S | (Ln) | | | |
| 22 | Rw | Ln | S | Lw | Rn | Rw | S | Lw | Rn | S | Rw | Ln | Lw | S | (Rw) | | | |
| 23 | Lw | Rw | S | Ln | Rn | Rw | S | Rw | Lw | S | Rn | Ln | Lw | S | (Lw) | | | |
| 24 | Rw | Lw | S | Ln | Rn | Rw | S | Lw | Rw | S | Rn | Ln | Lw | S | (Rw) | | | |
| 25 | Rn | Ln | S | Rw | Rw | Lw | S | Ln | Rn | S | Lw | Lw | Rw | S | (Rn) | | | |
| 26 | Ln | Rn | S | Rw | Rw | Lw | S | Rn | Ln | S | Lw | Lw | Rw | S | (Ln) | | | |
| 27 | Rn | Rw | S | Ln | Rw | Lw | S | Ln | Lw | S | Rn | Lw | Rw | S | (Rn) | | | |
| 28 | Rw | Rn | S | Ln | Rw | Lw | S | Lw | Ln | S | Rn | Lw | Rw | S | (Rw) | | | |
| 29 | Ln | Rw | S | Rn | Rw | Lw | S | Rn | Lw | S | Ln | Lw | Rw | S | (Ln) | | | |
| 30 | Rw | Ln | S | Rn | Rw | Lw | S | Lw | Rn | S | Ln | Lw | Rw | S | (Rw) | | | |
| 31 | Rn | Rw | S | Rw | Ln | Lw | S | Ln | Lw | S | Lw | Rn | Rw | S | (Rn) | | | |
| 32 | Rw | Rn | S | Rw | Ln | Lw | S | Lw | Ln | S | Lw | Rn | Rw | S | (Rw) | | | |
| 33 | Rw | Rw | S | Rn | Ln | Lw | S | Lw | Lw | S | Ln | Rn | Rw | S | (Rw) | | | |
| 34 | Ln | Rw | S | Rw | Rn | Lw | S | Rn | Rw | S | Lw | Ln | Rw | S | (Ln) | | | |
| 35 | Rw | Ln | S | Rw | Rn | Lw | S | Lw | Rn | S | Lw | Ln | Rw | S | (Rw) | | | |
| 36 | Rw | Rw | S | Ln | Rn | Lw | S | Lw | Lw | S | Rn | Ln | Rw | S | (Rw) | | | |
| 37 | Rn | Lw | S | Rw | Rw | Ln | S | Ln | Rw | S | Lw | Lw | Rn | S | (Rn) | | | |
| 38 | Lw | Rn | S | Rw | Rw | Ln | S | Rw | Ln | S | Lw | Lw | Rn | S | (Lw) | | | |
| 39 | Rn | Rw | S | Lw | Rw | Ln | S | Ln | Lw | S | Rw | Lw | Rn | S | (Rn) | | | |
| 40 | Rw | Rn | S | Lw | Rw | Ln | S | Lw | Ln | S | Rw | Lw | Rn | S | (Rw) | | | |
| 41 | Lw | Rw | S | Rn | Rw | Ln | S | Rw | Lw | S | Ln | Lw | Rn | S | (Lw) | | | |
| 42 | Rw | Lw | S | Rn | Rw | Ln | S | Lw | Rw | S | Ln | Lw | Rn | S | (Rw) | | | |
| 43 | Rn | Rw | S | Rw | Lw | Ln | S | Ln | Lw | S | Lw | Rw | Rn | S | (Rn) | | | |
| 44 | Rw | Rn | S | Rw | Lw | Ln | S | Lw | Ln | S | Lw | Rw | Rn | S | (Rw) | | | |
| 45 | Rw | Rw | S | Rn | Lw | Ln | S | Lw | Lw | S | Ln | Rw | Rn | S | (Rw) | | | |
| 46 | Lw | Rw | S | Rw | Rn | Ln | S | Rw | Lw | S | Lw | Ln | Rn | S | (Lw) | | | |
| 47 | Rw | Lw | S | Rw | Rn | Ln | S | Lw | Rw | S | Lw | Ln | Rn | S | (Rw) | | | |
| 48 | Rw | Rw | S | Lw | Rn | Ln | S | Lw | Lw | S | Rw | Ln | Rn | S | (Rw) | | | |
| 49 | Ln | Lw | S | Rw | Rw | Rn | S | Rn | Rw | S | Lw | Lw | Ln | S | (Ln) | | | |
| 50 | Lw | Ln | S | Rw | Rw | Rn | S | Rw | Rn | S | Lw | Lw | Ln | S | (Lw) | | | |
| 51 | Ln | Rw | S | Lw | Rw | Rn | S | Rn | Lw | S | Rw | Lw | Ln | S | (Ln) | | | |
| 52 | Rw | Ln | S | Lw | Rw | Rn | S | Lw | Rn | S | Rw | Lw | Ln | S | (Rw) | | | |
| 53 | Lw | Rw | S | Ln | Rw | Rn | S | Rw | Lw | S | Rn | Lw | Ln | S | (Lw) | | | |
| 54 | Rw | Lw | S | Ln | Rw | Rn | S | Lw | Rw | S | Rn | Lw | Ln | S | (Rw) | | | |
| 55 | Ln | Rw | S | Rw | Lw | Rn | S | Rn | Lw | S | Lw | Rw | Ln | S | (Ln) | | G | |
| 56 | Rw | Ln | S | Rw | Lw | Rn | S | Lw | Rn | S | Lw | Rw | Ln | S | (Rw) | G | G | G |
| 57 | Rw | Rw | S | Ln | Lw | Rn | S | Lw | Lw | S | Rn | Rw | Ln | S | (Rw) | G | | |
| 58 | Lw | Rw | S | Rw | Ln | Rn | S | Rw | Lw | S | Lw | Rn | Ln | S | (Lw) | | | |
| 59 | Rw | Lw | S | Rw | Ln | Rn | S | Lw | Rw | S | Lw | Rn | Ln | S | (Rw) | G | | G |
| 60 | Rw | Rw | S | Lw | Ln | Rn | S | Lw | Lw | S | Rw | Rn | Ln | S | (Rw) | G | | |

TABLE 2

TYPES AND NUMBER OF FUNCTIONAL TEETH IN GROUP A

Rn: 2 Rw: 1 Lw: 2

TRAVEL DIRECTION OF SAW BLADE

| | GROUP B | | | | | | | GROUP A | | | | | | | JUDGMENT OF PRE- & POST- POSITIONS OF | JUDGMENT OF SUCCESSIVE | JUDGMENT OF SELECTED |
|---|---|---|---|---|---|---|---|---|---|---|---|---|---|---|---|---|---|
| No. | 14 | 13 | 12 | 11 | 10 | 9 | 8 | 7 | 6 | 5 | 4 | 3 | 2 | 1 | (14) | STRAIGHT TOOTH | SET TEETH | PATTERN |
| 1 | Ln | Ln | S | Lw | Rw | Rw | S | Rn | Rn | S | Rw | Lw | Lw | S | (Ln) | | | |
| 2 | Ln | Lw | S | Ln | Rw | Rw | S | Rn | Rw | S | Rn | Lw | Lw | S | (Ln) | | | |

TABLE 2-continued

TYPES AND NUMBER OF FUNCTIONAL TEETH IN GROUP A

Rn: 2 Rw: 1 Lw: 2
TRAVEL DIRECTION OF SAW BLADE

| | GROUP B | | | | | | | GROUP A | | | | | | | JUDGMENT OF PRE- & POST- POSITIONS OF | JUDGMENT OF SUCCESSIVE | JUDGMENT OF SELECTED |
|---|---|---|---|---|---|---|---|---|---|---|---|---|---|---|---|---|---|
| No. | 14 | 13 | 12 | 11 | 10 | 9 | 8 | 7 | 6 | 5 | 4 | 3 | 2 | 1 | (14) | STRAIGHT TOOTH | SET TEETH | PATTERN |
| 3 | Lw | Ln | S | Ln | Rw | Rw | S | Rw | Rn | S | Rn | Lw | Lw | S | (Lw) | | | |
| 4 | Ln | Ln | S | Rw | Lw | Rw | S | Rn | Rn | S | Lw | Rw | Lw | S | (Ln) | | | |
| 5 | Ln | Rw | S | Ln | Lw | Rw | S | Rn | Lw | S | Rn | Rw | Lw | S | (Ln) | | | |
| 6 | Rw | Ln | S | Ln | Lw | Rw | S | Lw | Rn | S | Rn | Rw | Lw | S | (Rw) | | | |
| 7 | Ln | Lw | S | Rw | Ln | Rw | S | Rn | Rw | S | Lw | Rn | Lw | S | (Ln) | | | |
| 8 | Lw | Ln | S | Rw | Ln | Rw | S | Rw | Rn | S | Lw | Rn | Lw | S | (Lw) | | | |
| 9 | Ln | Rw | S | Lw | Ln | Rw | S | Rn | Lw | S | Rw | Rn | Lw | S | (Ln) | | | |
| 10 | Rw | Ln | S | Lw | Ln | Rw | S | Lw | Rn | S | Rw | Rn | Lw | S | (Rw) | | | |
| 11 | Lw | Rw | S | Ln | Ln | Rw | S | Rw | Lw | S | Rn | Rn | Lw | S | (Lw) | | | |
| 12 | Rw | Lw | S | Ln | Ln | Rw | S | Lw | Rw | S | Rn | Rn | Lw | S | (Rw) | | | |
| 13 | Ln | Ln | S | Rw | Rw | Lw | S | Rn | Rn | S | Lw | Lw | Rw | S | (Ln) | G | | |
| 14 | Ln | Rw | S | Ln | Rw | Lw | S | Rn | Lw | S | Rn | Lw | Rw | S | (Ln) | G | G | G |
| 15 | Rw | Ln | S | Ln | Rw | Lw | S | Lw | Rn | S | Rn | Lw | Rw | S | (Rw) | | G | |
| 16 | Ln | Rw | S | Rw | Ln | Lw | S | Rn | Lw | S | Lw | Rn | Rw | S | (Ln) | | | |
| 17 | Rw | Ln | S | Rw | Ln | Lw | S | Lw | Rn | S | Lw | Rn | Rw | S | (Rw) | | | |
| 18 | Rw | Rw | S | Ln | Ln | Lw | S | Lw | Lw | S | Rn | Rn | Rw | S | (Rw) | | | |
| 19 | Ln | Lw | S | Rw | Rw | Ln | S | Rn | Rw | S | Lw | Lw | Rn | S | (Ln) | G | | |
| 20 | Lw | Ln | S | Rw | Rw | Ln | S | Rw | Rn | S | Lw | Lw | Rn | S | (Lw) | G | | |
| 21 | Ln | Rw | S | Lw | Rw | Ln | S | Rn | Lw | S | Rw | Lw | Rn | S | (Ln) | G | G | G |
| 22 | Rw | Ln | S | Lw | Rw | Ln | S | Lw | Rn | S | Rw | Lw | Rn | S | (Rw) | | G | |
| 23 | Lw | Rw | S | Ln | Rw | Ln | S | Rw | Lw | S | Rn | Lw | Rn | S | (Lw) | G | G | G |
| 24 | Rw | Lw | S | Ln | Rw | Ln | S | Lw | Rw | S | Rn | Lw | Rn | S | (Rw) | | G | |
| 25 | Ln | Rw | S | Rw | Lw | Ln | S | Rn | Lw | S | Lw | Rw | Rn | S | (Ln) | | | |
| 26 | Rw | Ln | S | Rw | Lw | Ln | S | Lw | Rn | S | Lw | Rw | Rn | S | (Rw) | | | |
| 27 | Rw | Rw | S | Ln | Lw | Ln | S | Lw | Lw | S | Rn | Rw | Rn | S | (Rw) | | | |
| 28 | Lw | Rw | S | Rw | Ln | Ln | S | Rw | Lw | S | Lw | Rn | Rn | S | (Lw) | | | |
| 29 | Rw | Lw | S | Rw | Ln | Ln | S | Lw | Rw | S | Lw | Rn | Rn | S | (Rw) | | | |
| 30 | Rw | Rw | S | Lw | Ln | Ln | S | Lw | Lw | S | Rw | Rn | Rn | S | (Rw) | | | |

TABLE 3

TYPES AND NUMBER OF FUNCTIONAL TEETH IN GROUP A

Ln: 2 Rw: 1 Lw: 2
TRAVEL DIRECTION OF SAW BLADE

| | GROUP B | | | | | | | GROUP A | | | | | | | JUDGMENT OF PRE- & POST- POSITIONS OF | JUDGMENT OF SUCCESSIVE | JUDGMENT OF SELECTED |
|---|---|---|---|---|---|---|---|---|---|---|---|---|---|---|---|---|---|
| No. | 14 | 13 | 12 | 11 | 10 | 9 | 8 | 7 | 6 | 5 | 4 | 3 | 2 | 1 | (14) | STRAIGHT TOOTH | SET TEETH | PATTERN |
| 1 | Rn | Rn | S | Lw | Rw | Rw | S | Ln | Ln | S | Rw | Lw | Lw | S | (Rn) | G | | |
| 2 | Rn | Lw | S | Rn | Rw | Rw | S | Ln | Rw | S | Ln | Lw | Lw | S | (Rn) | G | | |
| 3 | Lw | Rn | S | Rn | Rw | Rw | S | Rw | Ln | S | Ln | Lw | Lw | S | (Lw) | | | |
| 4 | Rn | Rn | S | Rw | Lw | Rw | S | Ln | Ln | S | Lw | Rw | Lw | S | (Rn) | | | |
| 5 | Rn | Rw | S | Rn | Lw | Rw | S | Ln | Lw | S | Ln | Rw | LW | S | (Rn) | | | |
| 6 | Rw | Rn | S | Rn | Lw | Rw | S | Lw | Ln | S | Ln | Rw | Lw | S | (Rw) | | | |
| 7 | Rn | Lw | S | Rw | Rn | Rw | S | Ln | Rw | S | Lw | Ln | Lw | S | (Rn) | G | | |
| 8 | Lw | Rn | S | Rw | Rn | Rw | S | Rw | Ln | S | Lw | Ln | Lw | S | (Lw) | | | |
| 9 | Rn | Rw | S | Lw | Rn | Rw | S | Ln | Lw | S | Rw | Ln | Lw | S | (Rn) | G | | |
| 10 | Rw | Rn | S | Lw | Rn | Rw | S | Lw | Ln | S | Rw | Ln | Lw | S | (Rw) | G | | |
| 11 | Lw | Rw | S | Rn | Rn | Rw | S | Rw | Lw | S | Ln | Ln | Lw | S | (Lw) | | | |
| 12 | Rw | Lw | S | Rn | Rn | RW | S | Lw | Rw | S | Ln | Ln | Lw | S | (Rw) | G | | |
| 13 | Rn | Rn | S | Rw | Rw | Lw | S | Ln | Ln | S | Lw | Lw | Rw | S | (Rn) | | | |
| 14 | Rn | Rn | S | Rw | Rw | Lw | S | Ln | Ln | S | Ln | Lw | Rw | S | (Rn) | | | |
| 15 | Rw | Rn | S | Rn | Rw | Lw | S | Lw | Ln | S | Ln | Lw | Rw | S | (Rw) | | | |
| 16 | Rn | Rw | S | Rw | Rn | Lw | S | Ln | Lw | S | Lw | Ln | Rw | S | (Rn) | | | |
| 17 | Rw | Rn | S | Rw | Rn | Lw | S | Lw | Ln | S | Lw | Ln | Rw | S | (Rw) | | | |
| 18 | Rw | Rw | S | Rn | Rn | Lw | S | Lw | Lw | S | Ln | Ln | Rw | S | (Rw) | | | |
| 19 | Rn | Lw | S | Rw | Rw | Rn | S | Ln | Rw | S | Lw | Lw | Ln | S | (Rn) | G | | |
| 20 | Lw | Rn | S | Rw | Rw | Rn | S | Rw | Ln | S | Lw | Lw | Ln | S | (Lw) | | | |
| 21 | Rn | Rw | S | Lw | Rw | Rn | S | Ln | Lw | S | Rw | Lw | Ln | S | (Rn) | G | | |
| 22 | Rw | Rn | S | Lw | Rw | Rn | S | Lw | Ln | S | Rw | Lw | Ln | S | (Rw) | G | | |
| 23 | Lw | Rw | S | Rn | Rw | Rn | S | Rw | Lw | S | Ln | Lw | Ln | S | (Lw) | | | |
| 24 | Rw | Lw | S | Rn | Rw | Rn | S | Lw | Rw | S | Ln | Lw | Ln | S | (Rw) | G | | |
| 25 | Rn | Rw | S | Rw | Lw | Rn | S | Ln | Lw | S | Lw | Rw | Ln | S | (Rn) | | | |
| 26 | Rw | Rn | S | Rw | Lw | Rn | S | Lw | Ln | S | Lw | Rw | Ln | S | (Rw) | | | |
| 27 | Rw | Rw | S | Rn | Lw | Rn | S | Lw | Lw | S | Ln | Rw | Ln | S | (Rw) | | | |

TABLE 3-continued

TYPES AND NUMBER OF FUNCTIONAL TEETH IN GROUP A

| | Ln: 2 Rw: 1 Lw: 2 TRAVEL DIRECTION OF SAW BLADE | | | | | | | | | | | | | | JUDGMENT OF PRE- & POST- POSITIONS OF STRAIGHT TOOTH | JUDGMENT OF SUCCESSIVE SET TEETH | JUDGMENT OF SELECTED PATTERN |
|---|---|---|---|---|---|---|---|---|---|---|---|---|---|---|---|---|---|
| | GROUP B | | | | | | GROUP A | | | | | | | | | | |
| No. | 14 | 13 | 12 | 11 | 10 | 9 | 8 | 7 | 6 | 5 | 4 | 3 | 2 | 1 | (14) | | |
| 28 | Lw | Rw | S | Rw | Rn | Rn | S | Rw | Lw | S | Lw | Ln | Ln | S | (Lw) | | |
| 29 | Rw | Lw | S | Rw | Rn | Rn | S | Lw | Rw | S | Lw | Ln | Ln | S | (Rw) | G | |
| 30 | Rw | Rw | S | Lw | Rn | Rn | S | Lw | Lw | S | Rw | Ln | Ln | S | (Rw) | G | |

TABLE 4

TYPES AND NUMBER OF FUNCTIONAL TEETH IN GROUP A

| | Ln: 1 Rw: 1 Lw: 3 TRAVEL DIRECTION OF SAW BLADE | | | | | | | | | | | | | | JUDGMENT OF PRE- & POST- POSITIONS OF STRAIGHT TOOTH | JUDGMENT OF SUCCESSIVE SET TEETH | JUDGMENT OF SELECTED PATTERN |
|---|---|---|---|---|---|---|---|---|---|---|---|---|---|---|---|---|---|
| | GROUP B | | | | | | GROUP A | | | | | | | | | | |
| No. | 14 | 13 | 12 | 11 | 10 | 9 | 8 | 7 | 6 | 5 | 4 | 3 | 2 | 1 | (14) | | |
| 1 | Rn | Ln | S | Rw | Rw | Rw | S | Ln | Rn | S | Lw | Lw | Lw | S | (Rn) | G | |
| 2 | Ln | Rn | S | Rw | Rw | Rw | S | Rn | Ln | S | Lw | Lw | Lw | S | (Ln) | | |
| 3 | Rn | Rw | S | Ln | Rw | Rw | S | Ln | Lw | S | Rn | Lw | Lw | S | (Rn) | G | |
| 4 | Rw | Rn | S | Ln | Rw | Rw | S | Lw | Ln | S | Rn | Lw | Lw | S | (Rw) | G | |
| 5 | Ln | Rw | S | Rn | Rw | Rw | S | Rn | Lw | S | Ln | Lw | Lw | S | (Ln) | | |
| 6 | Rw | Ln | S | Rn | Rw | Rw | S | Lw | Rn | S | Ln | Lw | Lw | S | (Rw) | G | |
| 7 | Rn | Rw | S | Rw | Ln | Rw | S | Ln | Lw | S | Lw | Rn | Lw | S | (Rn) | | |
| 8 | Rw | Rn | S | Rw | Ln | Rw | S | Lw | Ln | S | Lw | Rn | Lw | S | (Rw) | | |
| 9 | Rw | Rw | S | Rn | Ln | Rw | S | Lw | Lw | S | Ln | Rn | Lw | S | (Rw) | | |
| 10 | Ln | Rw | S | Rw | Rn | Rw | S | Rn | Lw | S | Lw | Ln | Lw | S | (Ln) | | |
| 11 | Rw | Ln | S | Rw | Rn | Rw | S | Lw | Rn | S | Lw | Ln | Lw | S | (Rw) | G | |
| 12 | Rw | Rw | S | Ln | Rn | Rw | S | Lw | Lw | S | Rn | Ln | Lw | S | (Rw) | G | |
| 13 | Rn | Rw | S | Rw | Rw | Ln | S | Ln | Lw | S | Lw | Lw | Rn | S | (Rn) | | |
| 14 | Rw | Rn | S | Rw | Rw | Ln | S | Lw | Ln | S | Lw | Lw | Rn | S | (Rw) | | |
| 15 | Rw | Rw | S | Rn | Rw | Ln | S | Lw | Lw | S | Ln | Lw | Rn | S | (Rw) | | |
| 16 | Rw | Rw | S | Rw | Rn | Ln | S | Lw | Lw | S | Lw | Ln | Rn | S | (Rw) | | |
| 17 | Ln | Rw | S | Rw | Rw | Rn | S | Rn | Lw | S | Lw | Lw | Ln | S | (Ln) | | |
| 18 | Rw | Ln | S | Rw | Rw | Rn | S | Lw | Rn | S | Lw | Lw | Ln | S | (Rw) | G | |
| 19 | Rw | Rw | S | Ln | Rw | Rn | S | Lw | Lw | S | Rn | Lw | Ln | S | (Rw) | G | |
| 20 | Rw | Rw | S | Rw | Ln | Rn | S | Lw | Lw | S | Lw | Rn | Ln | S | (Rw) | | |

TABLE 5

TYPES AND NUMBER OF FUNCTIONAL TEETH IN GROUP A

| | Rn: 2 Lw: 3 TRAVEL DIRECTION OF SAW BLADE | | | | | | | | | | | | | | JUDGMENT OF PRE- & POST- POSITIONS OF STRAIGHT TOOTH | JUDGMENT OF SUCCESSIVE SET TEETH | JUDGMENT OF SELECTED PATTERN |
|---|---|---|---|---|---|---|---|---|---|---|---|---|---|---|---|---|---|
| | GROUP B | | | | | | GROUP A | | | | | | | | | | |
| No. | 14 | 13 | 12 | 11 | 10 | 9 | 8 | 7 | 6 | 5 | 4 | 3 | 2 | 1 | (14) | | |
| 1 | Ln | Ln | S | Rw | Rw | Rw | S | Rn | Rn | S | Lw | Lw | Lw | S | (Ln) | | |
| 2 | Ln | Rw | S | Ln | Rw | Rw | S | Rn | Lw | S | Rn | Lw | Lw | S | (Ln) | | |
| 3 | Rw | Ln | S | Ln | Rw | Rw | S | Lw | Rn | S | Rn | Lw | Lw | S | (Rw) | | |
| 4 | Ln | Rw | S | Rw | Ln | Rw | S | Rn | Lw | S | Lw | Rn | Lw | S | (Ln) | G | |
| 5 | Rw | Ln | S | Rw | Ln | Rw | S | Lw | Rn | S | Lw | Rn | Lw | S | (Rw) | G | G | G |
| 6 | Rw | Rw | S | Ln | Ln | Rw | S | Lw | Lw | S | Rn | Rn | Lw | S | (Rw) | G | |
| 7 | Ln | Rw | S | Rw | Rw | Ln | S | Rn | Lw | S | Lw | Lw | Rn | S | (Ln) | | |
| 8 | Rw | Ln | S | Rw | Rw | Ln | S | Lw | Rn | S | Lw | Lw | Rn | S | (Rw) | | |
| 9 | Rw | Rw | S | Ln | Rw | Ln | S | Lw | Lw | S | Rn | Lw | Rn | S | (Rw) | | |
| 10 | Rw | Rw | S | Rw | Ln | Ln | S | Lw | Lw | S | Lw | Rn | Rn | S | (Rw) | | |

TABLE 6-1

|  | No. | No. | (14) | (13) | (12) | (11) | (10) | (9) | (8) | (7) | (6) | (5) | (4) | (3) | (2) | (1) |
|---|---|---|---|---|---|---|---|---|---|---|---|---|---|---|---|---|
| TABLE 1 | 7 | 1 | Rn2 | Ln2 | S4 | Rw3 | Lw3 | Rw2 | S3 | Ln1 | Rn1 | S2 | Lw2 | Rw1 | Lw1 | S1 |
|  | 12 | 2 | Rw3 | Ln2 | S4 | Rn2 | Lw3 | Rw2 | S3 | Lw2 | Rn1 | S2 | Ln1 | Rw1 | Lw1 | S1 |
|  | 13 | 3 | Rn2 | Lw3 | S4 | Rw3 | Ln2 | Rw2 | S3 | Ln1 | Rw1 | S2 | Lw2 | Rn1 | Lw1 | S1 |
|  | 18 | 4 | Rw3 | Lw3 | S4 | Rn2 | Ln2 | Rw2 | S3 | Lw2 | Rw1 | S2 | Ln1 | Rn1 | Lw1 | S1 |
|  | 56 | 5 | Rw3 | Ln2 | S4 | Rw2 | Lw3 | Rn2 | S3 | Lw2 | Rn1 | S2 | Lw1 | Rw1 | Ln1 | S1 |
|  | 59 | 6 | Rw3 | Lw3 | S4 | Rw2 | Ln2 | Rn2 | S3 | Lw2 | Rw1 | S2 | Lw1 | Rn1 | Ln1 | S1 |
| TABLE 2 | 14 | 7 | Ln2 | Rw3 | S4 | Ln1 | Rw2 | Lw3 | S3 | Rn2 | Lw2 | S2 | Rn1 | Lw1 | Rw1 | S1 |
|  | 21 | 8 | Ln2 | Rw3 | S4 | Lw3 | Rw2 | Ln1 | S3 | Rn2 | Lw2 | S2 | Rw1 | Lw1 | Rn1 | S1 |
|  | 23 | 9 | Lw3 | Rw3 | S4 | Ln2 | Rw2 | Ln1 | S3 | Rw1 | Lw2 | S2 | Rn2 | Lw1 | Rn1 | S1 |
| TABLE 5 | 5 | 10 | Rw3 | Ln2 | S4 | Rw2 | Ln1 | Rw1 | S3 | Lw3 | Rn2 | S2 | Lw2 | Rn1 | Lw1 | S1 |

|  |  |  | GROUP B | | | | | | | GROUP A | | | | | | |
|---|---|---|---|---|---|---|---|---|---|---|---|---|---|---|---|---|
|  | No. | No. | 14 | 13 | 12 | 11 | 10 | 9 | 8 | 7 | 6 | 5 | 4 | 3 | 2 | 1 |
| TABLE 1 | 7 | 1 | Rn2 | Ln2 | S4 | Rw3 | Lw3 | Rw2 | S3 | Ln1 | Rn1 | S2 | Lw2 | Rw1 | Lw1 | S1 |
|  | 12 | 2 | Rw3 | Ln2 | S4 | Rn2 | Lw3 | Rw2 | S3 | Lw2 | Rn1 | S2 | Ln1 | Rw1 | Lw1 | S1 |
|  | 13 | 3 | Rn2 | Lw3 | S4 | Rw3 | Ln2 | Rw2 | S3 | Ln1 | Rw1 | S2 | Lw2 | Rn1 | Lw1 | S1 |
|  | 18 | 4 | Rw3 | Lw3 | S4 | Rn2 | Ln2 | Rw2 | S3 | Lw2 | Rw1 | S2 | Ln1 | Rn1 | Lw1 | S1 |
|  | 56 | 5 | Rw3 | Ln2 | S4 | Rw2 | Lw3 | Rn2 | S3 | Lw2 | Rn1 | S2 | Lw1 | Rw1 | Ln1 | S1 |
|  | 59 | 6 | Rw3 | Lw3 | S4 | Rw2 | Ln2 | Rn2 | S3 | Lw2 | Rw1 | S2 | Lw1 | Rn1 | Ln1 | S1 |
| TABLE 2 | 14 | 7 | Ln2 | Rw3 | S4 | Ln1 | Rw2 | Lw3 | S3 | Rn2 | Lw2 | S2 | Rn1 | Lw1 | Rw1 | S1 |
|  | 21 | 8 | Ln2 | Rw3 | S4 | Lw3 | Rw2 | Ln1 | S3 | Rn2 | Lw2 | S2 | Rw1 | Lw1 | Rn1 | S1 |
|  | 23 | 9 | Lw3 | Rw3 | S4 | Ln2 | Rw2 | Ln1 | S3 | Rw1 | Lw2 | S2 | Rn2 | Lw1 | Rn1 | S1 |
| TABLE 5 | 5 | 10 | Rw3 | Ln2 | S4 | Rw2 | Ln1 | Rw1 | S3 | Lw3 | Rn2 | S2 | Lw2 | Rn1 | Lw1 | S1 |

TABLE 6-2

|  |  |  | NUMBER OF PITCHES BETWEEN IDENTICAL FUNCTIONAL TEETH (L-SIDE SET TEETH) | | | | | NUMBER OF PITCHES BETWEEN IDENTICAL FUNCTIONAL TEETH (R-SIDE SET TEETH) | | | | | NARROW SET TEETH RATIO | WIDE SET TEETH RATIO |
|---|---|---|---|---|---|---|---|---|---|---|---|---|---|---|
|  | No. | No. | Ln2~Ln1 | Ln1~Ln2 | Lw3~Lw1 | Lw2~Lw3 | Lw1~Lw2 | Rn2~Rn1 | Rn1~Rn2 | Rw3~Rw1 | Rw2~Rw3 | Rw1~Rw2 |  |  |
| TABLE 1 | 7 | 1 | 8 | 6 | 6 | 6 | 2 | 6 | 8 | 6 | 2 | 6 | 1.3 | 3.0 |
|  | 12 | 2 | 5 | 9 | 6 | 3 | 5 | 9 | 5 | 3 | 5 | 6 | 1.8 | 2.0 |
|  | 13 | 3 | 11 | 3 | 3 | 9 | 2 | 3 | 11 | 9 | 2 | 3 | 3.7 | 4.5 |
|  | 18 | 4 | 8 | 6 | 3 | 6 | 5 | 6 | 8 | 6 | 5 | 3 | 1.3 | 2.0 |
|  | 56 | 5 | 3 | 11 | 8 | 3 | 3 | 11 | 3 | 3 | 3 | 8 | 3.7 | 2.7 |
|  | 59 | 6 | 6 | 8 | 5 | 6 | 3 | 8 | 6 | 6 | 3 | 5 | 1.3 | 2.0 |
| TABLE 2 | 14 | 7 | 11 | 3 | 8 | 3 | 3 | 11 | 3 | 3 | 3 | 8 | 3.7 | 2.7 |
|  | 21 | 8 | 9 | 5 | 6 | 5 | 3 | 9 | 5 | 5 | 3 | 6 | 1.8 | 2.0 |
|  | 23 | 9 | 12 | 2 | 3 | 8 | 3 | 12 | 2 | 8 | 3 | 3 | 6.0 | 2.7 |
| TABLE 5 | 5 | 10 | 11 | 3 | 9 | 3 | 2 | 11 | 3 | 9 | 3 | 2 | 3.7 | 4.5 |

TABLE 7

MEASURED TEETH FOR TOOTH-TIP ABRASION LOSS

|  | NARROW SET TEETH | | WIDE SET TEETH | |
|---|---|---|---|---|
|  | MAXIMUM LOAD TEETH | MINIMUM LOAD TEETH | MAXIMUM LOAD TEETH | MINIMUM LOAD TEETH |
| No. 1 | AVERAGE OF Rn2 AND Ln1 | AVERAGE OF Rn1 AND Ln2 | AVERAGE OF Rw2 AND Lw1 | AVERAGE OF Rw3 AND Lw2 |
| No. 2 | AVERAGE OF Rn1 AND Ln2 | AVERAGE OF Rn2 AND Ln1 | AVERAGE OF Rw2 AND Lw1 | AVERAGE OF Rw1 AND Lw3 |
| No. 3 | AVERAGE OF Rn2 AND Ln1 | AVERAGE OF Rn1 AND Ln2 | AVERAGE OF Rw1 AND Lw3 | AVERAGE OF Rw3 AND Lw2 |
| No. 4 | AVERAGE OF Rn2 AND Ln1 | AVERAGE OF Rn1 AND Ln2 | AVERAGE OF Rw1 AND Lw3 | AVERAGE OF Rw2 AND Lw1 |
| No. 5 | AVERAGE OF Rn1 AND Ln2 | AVERAGE OF Rn2 AND Ln1 | AVERAGE OF Rw2 AND Lw1 | AVERAGE OF Rw3 AMD Lw2 |
| No. 6 | AVERAGE OF Rn1 AND Ln2 | AVERAGE OF Rn2 AND Ln1 | AVERAGE OF Rw1 AND Lw3 | AVERAGE OF Rw3 AND Lw2 |
| No. 7 | AVERAGE OF Rn1 AND Ln1 | AVERAGE OF Rn2 AND Ln2 | AVERAGE OF Rw2 AND Lw1 | AVERAGE OF Rw3 AND Lw2 |

TABLE 7-continued

MEASURED TEETH FOR TOOTH-TIP ABRASION LOSS

|  | NARROW SET TEETH | | WIDE SET TEETH | |
|---|---|---|---|---|
|  | MAXIMUM LOAD TEETH | MINIMUM LOAD TEETH | MAXIMUM LOAD TEETH | MINIMUM LOAD TEETH |
| No. 8 | AVERAGE OF Rn1 AND Ln1 | AVERAGE OF Rn2 AND Ln2 | AVERAGE OF Rw2 AND Lw1 | AVERAGE OF Rw3 AND Lw2 |
| No. 9 | AVERAGE OF Rn1 AND Ln1 | AVERAGE OF Rn2 AND Ln2 | AVERAGE OF Rw1 AND Lw3 | AVERAGE OF Rw3 ANP Lw2 |
| No.10 | AVERAGE OF Rn1 AND Ln1 | AVERAGE OF Rn2 AND Ln2 | AVERAGE OF Rw1 AND Lw1 | AVERAGE OF Rw2 AND Lw2 |

TABLE 8-1

| No. | w (18) R | 4 (17) L | n (16) R | 3 (15) S | (14) L | (13) R | (12) L | (11) R | (10) S | (9) L | (8) R | (7) L | (6) S | (5) R | (4) L | (3) R | (2) L | (1) S |
|---|---|---|---|---|---|---|---|---|---|---|---|---|---|---|---|---|---|---|
| 1 | Rw4 | Lw4 | Rw3 | S4 | Lw3 | Rn3 | Ln3 | Rn2 | S3 | Lw2 | Rw2 | Lw1 | S2 | Rw1 | Ln2 | Rn1 | Ln1 | S1 |
| 2 | Rw4 | Lw4 | Rw3 | S4 | Ln3 | Rw2 | Ln2 | Rn3 | S3 | Lw3 | Rw1 | Lw2 | S2 | Rn2 | Lw1 | Rn1 | Ln1 | S1 |
| 3 | Rw4 | Lw4 | Rw3 | S4 | Ln3 | Rn3 | Lw3 | Rn2 | S3 | Lw2 | Rw2 | Lw1 | S2 | Rn1 | Ln2 | Rw1 | Ln1 | S1 |
| 4 | Rw4 | Lw4 | Rw3 | S4 | Ln3 | Rn3 | Ln2 | Rw2 | S3 | Lw3 | Rw1 | Lw2 | S2 | Rn2 | Ln1 | Rn1 | Lw1 | S1 |
| 5 | Rw4 | Lw4 | Rn3 | S4 | Lw3 | Rw3 | Ln3 | Rn2 | S3 | Lw2 | Rw2 | Ln2 | S2 | Rw1 | Lw1 | Rn1 | Ln1 | S1 |
| 6 | Rw4 | Lw4 | Rn3 | S4 | Lw3 | Rn2 | Lw2 | Rn1 | S3 | Lw1 | Rw3 | Ln3 | S2 | Rw2 | Ln2 | Rw1 | Ln1 | S1 |
| 7 | Rw4 | Lw4 | Rn3 | S4 | Lw3 | Rn2 | Ln3 | Rw3 | S3 | Lw2 | Rw2 | Ln2 | S2 | Rw1 | Ln1 | Rn1 | Lw1 | S1 |
| 8 | Rw4 | Lw4 | Rn3 | S4 | Ln3 | Rw3 | Lw3 | Rn2 | S3 | Lw2 | Rw2 | Ln2 | S2 | Rn1 | Lw1 | Rw1 | Ln1 | S1 |
| 9 | Rw4 | Lw4 | Rn3 | S4 | Ln3 | Rw3 | Ln2 | Rw2 | S3 | Lw3 | Rw1 | Ln1 | S2 | Rn2 | Lw2 | Rn1 | Lw1 | S1 |
| 10 | Rw4 | Lw4 | Rn3 | S4 | Ln3 | Rn2 | Lw3 | Rw3 | S3 | Lw2 | Rw2 | Ln2 | S2 | Rn1 | Ln1 | Rw1 | Lw1 | S1 |
| 11 | Rw4 | Ln3 | Rw3 | S4 | Lw4 | Rw2 | Ln2 | Rn3 | S3 | Lw3 | Rn2 | Lw2 | S2 | Rw1 | Lw1 | Rn1 | Ln1 | S1 |
| 12 | Rw4 | Ln3 | Rw3 | S4 | Lw4 | Rn3 | Lw3 | Rn2 | S3 | Lw2 | Rn1 | Lw1 | S2 | Rw2 | Ln2 | Rw1 | Ln1 | S1 |
| 13 | Rw4 | Ln3 | Rw3 | S4 | Lw4 | Rn3 | Ln2 | Rw2 | S3 | Lw3 | Rn2 | Lw2 | S2 | Rw1 | Ln1 | Rn1 | Lw1 | S1 |
| 14 | Rw4 | Ln3 | Rw3 | S4 | Ln2 | Rw2 | Lw4 | Rn3 | S3 | Lw3 | Rn2 | Lw2 | S2 | Rn1 | Lw1 | Rn1 | Ln1 | S1 |
| 15 | Rw4 | Ln3 | Rw3 | S4 | Ln2 | Rw2 | Ln1 | Rw1 | S3 | Lw4 | Rn3 | Lw3 | S2 | Rn2 | Lw2 | Rn1 | Lw1 | S1 |
| 16 | Rw4 | Ln3 | Rw3 | S4 | Ln2 | Rn3 | Lw4 | Rw2 | S3 | Lw3 | Rn2 | Lw2 | S2 | Rn1 | Ln1 | Rw1 | Lw1 | S1 |
| 17 | Rn3 | Lw4 | Rw4 | S4 | Lw3 | Rw3 | Ln3 | Rn2 | S3 | Ln2 | Rw2 | Lw2 | S2 | Rw1 | Lw1 | Rn1 | Ln1 | S1 |
| 18 | Rn3 | Lw4 | Rw4 | S4 | Lw3 | Rn2 | Lw2 | Rn1 | S3 | Ln3 | Rw3 | Lw1 | S2 | Rw2 | Ln2 | Rw1 | Ln1 | S1 |

| | GROUP B | | | | | | | | | GROUP A | | | | | | | | |
|---|---|---|---|---|---|---|---|---|---|---|---|---|---|---|---|---|---|---|
| No. | 18 R | 17 L | 16 R | 15 S | 14 L | 13 R | 12 L | 11 R | 10 S | 9 L | 8 R | 7 L | 6 S | 5 R | 4 L | 3 R | 2 L | 1 S |
| 1 | Rw4 | Lw4 | Rw3 | S4 | Lw3 | Rn3 | Ln3 | Rn2 | S3 | Lw2 | Rw2 | Lw1 | S2 | Rw1 | Ln2 | Rn1 | Ln1 | S1 |
| 2 | Rw4 | Lw4 | Rw3 | S4 | Ln3 | Rw2 | Ln2 | Rn3 | S3 | Lw3 | Rw1 | Lw2 | S2 | Rn2 | Lw1 | Rn1 | Ln1 | S1 |
| 3 | Rw4 | Lw4 | Rw3 | S4 | Ln3 | Rn3 | Lw3 | Rn2 | S3 | Lw2 | Rw2 | Lw1 | S2 | Rn1 | Ln2 | Rw1 | Ln1 | S1 |
| 4 | Rw4 | Lw4 | Rw3 | S4 | Ln3 | Rn3 | Ln2 | Rw2 | S3 | Lw3 | Rw1 | Lw2 | S2 | Rn2 | Ln1 | Rn1 | Lw1 | S1 |
| 5 | Rw4 | Lw4 | Rn3 | S4 | Lw3 | Rw3 | Ln3 | Rn2 | S3 | Lw2 | Rw2 | Ln2 | S2 | Rw1 | Lw1 | Rn1 | Ln1 | S1 |
| 6 | Rw4 | Lw4 | Rn3 | S4 | Lw3 | Rn2 | Lw2 | Rn1 | S3 | Lw1 | Rw3 | Ln3 | S2 | Rw2 | Ln2 | Rw1 | Ln1 | S1 |
| 7 | Rw4 | Lw4 | Rn3 | S4 | Lw3 | Rn2 | Ln3 | Rw3 | S3 | Lw2 | Rw2 | Ln2 | S2 | Rw1 | Ln1 | Rn1 | Lw1 | S1 |
| 8 | Rw4 | Lw4 | Rn3 | S4 | Ln3 | Rw3 | Lw3 | Rn2 | S3 | Lw2 | Rw2 | Ln2 | S2 | Rn1 | Lw1 | Rw1 | Ln1 | S1 |
| 9 | Rw4 | Lw4 | Rn3 | S4 | Ln3 | Rw3 | Ln2 | Rw2 | S3 | Lw3 | Rw1 | Ln1 | S2 | Rn2 | Lw2 | Rn1 | Lw1 | S1 |
| 10 | Rw4 | Lw4 | Rn3 | S4 | Ln3 | Rn2 | Lw3 | Rw3 | S3 | Lw2 | Rw2 | Ln2 | S2 | Rn1 | Ln1 | Rw1 | Lw1 | S1 |
| 11 | Rw4 | Ln3 | Rw3 | S4 | Lw4 | Rw2 | Ln2 | Rn3 | S3 | Lw3 | Rn2 | Lw2 | S2 | Rw1 | Lw1 | Rn1 | Ln1 | S1 |
| 12 | Rw4 | Ln3 | Rw3 | S4 | Lw4 | Rn3 | Lw3 | Rn2 | S3 | Lw2 | Rn1 | Lw1 | S2 | Rw2 | Ln2 | Rw1 | Ln1 | S1 |
| 13 | Rw4 | Ln3 | Rw3 | S4 | Lw4 | Rn3 | Ln2 | Rw2 | S3 | Lw3 | Rn2 | Lw2 | S2 | Rw1 | Ln1 | Rn1 | Lw1 | S1 |
| 14 | Rw4 | Ln3 | Rw3 | S4 | Ln2 | Rw2 | Lw4 | Rn3 | S3 | Lw3 | Rn2 | Lw2 | S2 | Rn1 | Lw1 | Rw1 | Ln1 | S1 |
| 15 | Rw4 | Ln3 | Rw3 | S4 | Ln2 | Rw2 | Ln1 | Rw1 | S3 | Lw4 | Rn3 | Lw3 | S2 | Rn2 | Lw2 | Rn1 | Lw1 | S1 |
| 16 | Rw4 | Ln3 | Rw3 | S4 | Ln2 | Rn3 | Lw4 | Rw2 | S3 | Lw3 | Rn2 | Lw2 | S2 | Rn1 | Ln1 | Rw1 | Lw1 | S1 |
| 17 | Rn3 | Lw4 | Rw4 | S4 | Lw3 | Rw3 | Ln3 | Rn2 | S3 | Ln2 | Rw2 | Lw2 | S2 | Rw1 | Lw1 | Rn1 | Ln1 | S1 |
| 18 | Rn3 | Lw4 | Rw4 | S4 | Lw3 | Rn2 | Lw2 | Rn1 | S3 | Ln3 | Rw3 | Lw1 | S2 | Rw2 | Ln2 | Rw1 | Ln1 | S1 |

TABLE 8-2

| No. | w (18) R | 4 (17) L | n (16) R | 3 (15) S | (14) L | (13) R | (12) L | (11) R | (10) S | (9) L | (8) R | (7) L | (6) S | (5) R | (4) L | (3) R | (2) L | (1) S |
|---|---|---|---|---|---|---|---|---|---|---|---|---|---|---|---|---|---|---|
| 19 | Rn3 | Lw4 | Rw4 | S4 | Lw3 | Rn2 | Ln3 | Rw3 | S3 | Ln2 | Rw2 | Lw2 | S2 | Rw1 | Ln1 | Rn1 | Lw1 | S1 |
| 20 | Rn3 | Lw4 | Rw4 | S4 | Ln3 | Rw3 | Lw3 | Rn2 | S3 | Ln2 | Rw2 | Lw2 | S2 | Rn1 | Lw1 | Rw1 | Ln1 | S1 |

TABLE 8-2-continued

| No | 18 R | 17 L | 16 R | 15 S | 14 L | 13 R | 12 L | 11 R | 10 S | 9 L | 8 R | 7 L | 6 S | 5 R | 4 L | 3 R | 2 L | 1 S |
|---|---|---|---|---|---|---|---|---|---|---|---|---|---|---|---|---|---|---|
| 21 | Rn3 | Lw4 | Rw4 | S4 | Ln3 | Rw3 | Ln2 | Rw2 | S3 | Ln1 | Rw1 | Lw3 | S2 | Rn2 | Lw2 | Rn1 | Lw1 | S1 |
| 22 | Rn3 | Lw4 | Rw4 | S4 | Ln2 | Rn2 | Lw3 | Rw3 | S3 | Ln2 | Rw2 | Lw2 | S2 | Rn1 | Ln1 | Rw1 | Lw1 | S1 |
| 23 | Rw4 | Ln3 | Rn3 | S4 | Lw4 | Rw3 | Lw3 | Rn2 | S3 | Lw2 | Rn1 | Ln2 | S2 | Rw2 | Lw1 | Rw1 | Ln1 | S1 |
| 24 | Rw4 | Ln3 | Rn3 | S4 | Lw4 | Rw3 | Ln2 | Rw2 | S3 | Lw3 | Rn2 | Ln1 | S2 | Rw1 | Lw2 | Rn1 | Lw1 | S1 |
| 25 | Rw4 | Ln3 | Rn3 | S4 | Lw4 | Rn2 | Lw3 | Rw3 | S3 | Lw2 | Rn1 | Ln2 | S2 | Rw2 | Ln1 | Rw1 | Lw1 | S1 |
| 26 | Rw4 | Ln3 | Rn3 | S4 | Ln2 | Rw3 | Lw4 | Rw2 | S3 | Lw3 | Rn2 | Ln1 | S2 | Rn1 | Lw2 | Rw1 | Lw1 | S1 |
| 27 | Rn3 | Lw4 | Rn2 | S4 | Lw3 | Rw4 | Lw2 | Rn1 | S3 | Ln3 | Rw3 | Ln2 | S2 | Rw2 | Lw1 | Rw1 | Ln1 | S1 |
| 28 | Rn3 | Lw4 | Rn2 | S4 | Rw4 | Ln3 | Rw3 | Ln1 | S3 | Ln2 | Rw2 | Ln1 | S2 | Rw1 | Lw2 | Rn1 | Lw1 | S1 |
| 29 | Rn3 | Lw4 | Rn2 | S4 | Lw3 | Rn1 | Lw2 | Rw4 | S3 | Ln3 | Rw3 | Ln2 | S2 | Rw2 | Ln1 | Rw1 | Lw1 | S1 |
| 30 | Rn3 | Lw4 | Rn2 | S4 | Ln3 | Rw4 | Lw3 | Rw3 | S3 | Ln2 | Rw2 | Ln1 | S2 | Rn1 | Lw2 | Rw1 | Lw1 | S1 |
| 31 | Rn3 | Ln3 | Rw4 | S4 | Lw3 | Rw3 | Lw2 | Rn2 | S3 | Ln2 | Rn1 | Lw2 | S2 | Rw2 | Lw1 | Rw1 | Ln1 | S1 |
| 32 | Rn3 | Ln3 | Rw4 | S4 | Lw4 | Rw3 | Ln3 | Rw2 | S3 | Ln1 | Rn2 | Lw3 | S2 | Rw1 | Lw2 | Rn1 | Lw1 | S1 |
| 33 | Rn3 | Ln3 | Rw4 | S4 | Lw4 | Rn2 | Lw3 | Rw3 | S3 | Ln2 | Rn1 | Lw2 | S2 | Rw2 | Ln1 | Rw1 | Lw1 | S1 |
| 34 | Rn3 | Ln3 | Rw4 | S4 | Ln2 | Rw3 | Lw4 | Rw2 | S3 | Ln1 | Rn2 | Lw3 | S2 | Rn1 | Lw2 | Rw1 | Lw1 | S1 |
| 35 | Rn3 | Ln3 | Rn2 | S4 | Lw4 | Rw4 | Lw3 | Rw3 | S3 | Ln2 | Rn1 | Ln1 | S2 | Rw2 | Lw2 | Rw1 | Lw1 | S1 |

| | GROUP B | | | | | | | | | GROUP A | | | | | | | | |
|---|---|---|---|---|---|---|---|---|---|---|---|---|---|---|---|---|---|---|
| No | 18 R | 17 L | 16 R | 15 S | 14 L | 13 R | 12 L | 11 R | 10 S | 9 L | 8 R | 7 L | 6 S | 5 R | 4 L | 3 R | 2 L | 1 S |
| 19 | Rn3 | Lw4 | Rw4 | S4 | Lw3 | Rn2 | Ln3 | Rw3 | S3 | Ln2 | Rw2 | Lw2 | S2 | Rw1 | Ln1 | Rn1 | Lw1 | S1 |
| 20 | Rn3 | Lw4 | Rw4 | S4 | Ln3 | Rw3 | Lw3 | Rn2 | S3 | Ln2 | Rw2 | Lw2 | S2 | Rn1 | Lw1 | Rw1 | Ln1 | S1 |
| 21 | Rn3 | Lw4 | Rw4 | S4 | Ln3 | Rw3 | Ln2 | Rw2 | S3 | Ln1 | Rw1 | Lw3 | S2 | Rn2 | Lw2 | Rn1 | Lw1 | S1 |
| 22 | Rn3 | Lw4 | Rw4 | S4 | Ln2 | Rw2 | Lw3 | Rw3 | S3 | Ln2 | Rw2 | Lw2 | S2 | Rn1 | Ln1 | Rw1 | Lw1 | S1 |
| 23 | Rw4 | Ln3 | Rn3 | S4 | Lw4 | Rw3 | Lw3 | Rn2 | S3 | Lw2 | Rn1 | Ln2 | S2 | Rw2 | Lw1 | Rw1 | Ln1 | S1 |
| 24 | Rw4 | Ln3 | Rn3 | S4 | Lw4 | Rw3 | Ln2 | Rw2 | S3 | Lw3 | Rn2 | Ln1 | S2 | Rw1 | Lw2 | Rn1 | Lw1 | S1 |
| 25 | Rw4 | Ln3 | Rn3 | S4 | Lw4 | Rn2 | Lw3 | Rw3 | S3 | Lw2 | Rn1 | Ln2 | S2 | Rw2 | Ln1 | Rw1 | Lw1 | S1 |
| 26 | Rw4 | Ln3 | Rn3 | S4 | Ln2 | Rw3 | Lw4 | Rw2 | S3 | Lw3 | Rn2 | Ln1 | S2 | Rn1 | Lw2 | Rw1 | Lw1 | S1 |
| 27 | Rn3 | Lw4 | Rn2 | S4 | Lw3 | Rw4 | Lw2 | Rn1 | S3 | Ln3 | Rw3 | Ln2 | S2 | Rw2 | Lw1 | Rw1 | Ln1 | S1 |
| 28 | Rn3 | Lw4 | Rn2 | S4 | Lw3 | Rw4 | Ln3 | Rw3 | S3 | Ln2 | Rw2 | Ln1 | S2 | Rw1 | Lw2 | Rn1 | Lw1 | S1 |
| 29 | Rn3 | Lw4 | Rn2 | S4 | Lw3 | Rn1 | Lw2 | Rw4 | S3 | Ln3 | Rw3 | Ln2 | S2 | Rw2 | Ln1 | Rw1 | Lw1 | S1 |
| 30 | Rn3 | Lw4 | Rn2 | S4 | Ln3 | Rw4 | Lw3 | Rw3 | S3 | Ln2 | Rw2 | Ln1 | S2 | Rn1 | Lw2 | Rw1 | Lw1 | S1 |
| 31 | Rn3 | Ln3 | Rw4 | S4 | Lw3 | Rw3 | Lw2 | Rn2 | S3 | Ln2 | Rn1 | Lw2 | S2 | Rw2 | Lw1 | Rw1 | Ln1 | S1 |
| 32 | Rn3 | Ln3 | Rw4 | S4 | Lw4 | Rw3 | Ln3 | Rw2 | S3 | Ln1 | Rn2 | Lw3 | S2 | Rw1 | Lw2 | Rn1 | Lw1 | S1 |
| 33 | Rn3 | Ln3 | Rw4 | S4 | Lw4 | Rn2 | Lw3 | Rw3 | S3 | Ln2 | Rn1 | Lw2 | S2 | Rw2 | Ln1 | Rw1 | Lw1 | S1 |
| 34 | Rn3 | Ln3 | Rw4 | S4 | Ln2 | Rw3 | Lw4 | Rw2 | S3 | Ln1 | Rn2 | Lw3 | S2 | Rn1 | Lw2 | Rw1 | Lw1 | S1 |
| 35 | Rn3 | Ln3 | Rn2 | S4 | Lw4 | Rw4 | Lw3 | Rw3 | S3 | Ln2 | Rn1 | Ln1 | S2 | Rw2 | Lw2 | Rw1 | Lw1 | S1 |

TABLE 8-3

| | NUMBER OF PITCHES BETWEEN IDENTICAL FUNCTIONAL TEETH (R-SIDE SET TEETH) | | | | | | | NARROW SET TEETH RATIO | WIDE SET TEETH RATIO |
|---|---|---|---|---|---|---|---|---|---|
| No | Rn1~Rn2 | Rn2~Rn3 | Rn3~Rn1 | Rw1~Rw2 | Rw2~Rw3 | Rw3~Rw4 | Rw4~Rw1 | | |
| 1 | 8 | 2 | 8 | 3 | 8 | 2 | 5 | 4.0 | 4.0 |
| 2 | 2 | 6 | 10 | 5 | 3 | 2 | 8 | 5.0 | 4.0 |
| 3 | 6 | 2 | 10 | 5 | 8 | 2 | 3 | 5.0 | 4.0 |
| 4 | 2 | 8 | 8 | 3 | 5 | 2 | 8 | 4.0 | 4.0 |
| 5 | 8 | 5 | 5 | 3 | 5 | 5 | 5 | 1.6 | 1.7 |
| 6 | 2 | 3 | 13 | 2 | 3 | 10 | 3 | 6.5 | 5.0 |
| 7 | 10 | 3 | 5 | 3 | 3 | 7 | 5 | 3.3 | 2.3 |
| 8 | 6 | 5 | 7 | 5 | 5 | 5 | 3 | 1.4 | 1.7 |
| 9 | 2 | 11 | 5 | 3 | 2 | 5 | 8 | 5.5 | 4.0 |
| 10 | 8 | 3 | 7 | 5 | 3 | 7 | 3 | 2.7 | 2.3 |
| 11 | 5 | 3 | 10 | 8 | 3 | 2 | 5 | 3.3 | 4.0 |
| 12 | 3 | 2 | 13 | 2 | 11 | 2 | 3 | 6.5 | 5.5 |
| 13 | 5 | 5 | 8 | 6 | 5 | 2 | 5 | 1.6 | 3.0 |
| 14 | 3 | 3 | 12 | 10 | 3 | 2 | 3 | 4.0 | 5.0 |
| 15 | 2 | 3 | 13 | 2 | 3 | 2 | 11 | 6.5 | 5.5 |
| 16 | 3 | 5 | 10 | 8 | 5 | 2 | 3 | 3.3 | 4.0 |
| 17 | 8 | 7 | 3 | 4 | 5 | 3 | 7 | 2.7 | 2.3 |
| 18 | 2 | 5 | 11 | 2 | 3 | 8 | 5 | 5.5 | 4.0 |
| 19 | 10 | 5 | 3 | 3 | 3 | 5 | 7 | 3.3 | 2.3 |
| 20 | 6 | 7 | 3 | 5 | 5 | 3 | 5 | 2.3 | 1.7 |
| 21 | 2 | 13 | 3 | 3 | 2 | 3 | 10 | 6.5 | 5.0 |
| 22 | 8 | 5 | 5 | 5 | 3 | 5 | 5 | 1.6 | 1.7 |
| 23 | 3 | 5 | 10 | 2 | 8 | 5 | 3 | 3.3 | 4.0 |
| 24 | 5 | 8 | 5 | 6 | 2 | 5 | 5 | 1.6 | 3.0 |
| 25 | 5 | 3 | 10 | 2 | 6 | 7 | 3 | 3.3 | 3.5 |
| 26 | 3 | 8 | 7 | 8 | 2 | 5 | 3 | 2.7 | 4.0 |
| 27 | 5 | 2 | 11 | 2 | 3 | 5 | 8 | 5.5 | 4.0 |
| 28 | 13 | 2 | 3 | 3 | 3 | 2 | 10 | 6.5 | 5.0 |
| 29 | 3 | 2 | 13 | 2 | 3 | 3 | 4 | 6.5 | 2.0 |

TABLE 8-3-continued

| | NUMBER OF PITCHES BETWEEN IDENTICAL FUNCTIONAL TEETH (R-SIDE SET TEETH) | | | | | | | NARROW SET TEETH RATIO | WIDE SET TEETH RATIO |
|---|---|---|---|---|---|---|---|---|---|
| No | Rn1~Rn2 | Rn2~Rn3 | Rn3~Rn1 | Rw1~Rw2 | Rw2~Rw3 | Rw3~Rw4 | Rw4~Rw1 | | |
| 30 | 11 | 2 | 5 | 5 | 3 | 2 | 8 | 5.5 | 4.0 |
| 31 | 3 | 7 | 8 | 2 | 8 | 3 | 5 | 2.7 | 4.0 |
| 32 | 5 | 10 | 3 | 6 | 2 | 3 | 7 | 3.3 | 3.5 |
| 33 | 5 | 5 | 8 | 2 | 6 | 5 | 5 | 1.6 | 3.0 |
| 34 | 3 | 10 | 5 | 8 | 2 | 3 | 5 | 3.3 | 4.0 |
| 35 | 8 | 2 | 8 | 2 | 6 | 2 | 8 | 4.0 | 4.0 |

The invention claimed is:

1. A saw blade including straight teeth and set teeth, each of the set teeth having a set-bending side that is set to one of a left and a right side of the straight teeth, each of the set teeth having a width that is set to one of a wide-width and a narrow-width, wherein a width of the wide-width is larger than a width of the narrow-width, the blade comprising:
a first arrangement of teeth that is composed of, successively from a cutting leading side, a first group of teeth composed of a first straight tooth among the straight teeth and an even number of a first sub-group of set teeth among the set teeth, and a second group of teeth that is sequentially next to the first group of teeth and is composed of a second straight tooth among the straight teeth and an odd number of a second sub-group of set teeth among the set teeth, and
a second arrangement of teeth that is sequentially next to the first arrangement of teeth, and is composed of, successively from the cutting leading side, a third group of teeth composed of a third straight tooth among the straight teeth and an even number of a third-subgroup of set teeth having set-bending sides that are opposite to those of the even number of the first sub-group of set teeth in the first group of teeth, and a fourth group of teeth that is sequentially next to the third group of teeth and is composed of a fourth straight tooth among the straight teeth and an odd number of a fourth sub-group of set teeth whose set-bending sides are opposite to those of the odd number of the second sub-group of set teeth in the second group of teeth, wherein
the first arrangement of teeth and the second arrangement of teeth are arranged alternately and repeatedly, and
wide set teeth having the wide-width and narrow set teeth having the narrow-width are arranged so that a ratio of a maximum value to a minimum value of the number of pitches between the narrow set teeth having an identical set-bending side and an identical set width is 1.8 or less, and a ratio of a maximum value to a minimum value of the number of pitches between the wide set teeth having an identical set-bending side and an identical set width is 2.7 or less.

2. The saw blade according to claim 1, wherein each of the group first group of teeth and the third group of teeth includes four set teeth, and each of the second group of teeth and the fourth group of teeth includes three set teeth.

3. The saw blade according to claim 2, wherein, arrangements of saw teeth, successively from the cutting leading side, in the first arrangement of teeth and the second arrangement of teeth are set as follows:
the first group of teeth including: successively, the first straight tooth; a first left-side narrow set tooth, among the first sub-group of set teeth, having the set-bending side set to the left side of the straight teeth; a first right-side narrow set tooth, among the first sub-group of set teeth, having the set-bending side set to the right side of the straight teeth; a first left-side wide set tooth, among the first sub-group of set teeth, having the set-bending side set to the left side of the straight teeth; and a first right-side wide set tooth, among the first sub-group of set teeth, having the set-bending side set to the right side of the straight teeth;
the second group of teeth including: successively, the second straight tooth; a second left-side narrow set tooth, among the second sub-group of set teeth, having the set-bending side set to the left side of the straight teeth; a second right-side wide set tooth, among the second sub-group of set teeth, having the set-bending side set to the right side of the straight teeth; and a second left-side wide set tooth, among the second sub-group of set teeth, having the set-bending side set to the left side of the straight teeth;
the third group of teeth including: successively, the third straight tooth; a second right-side narrow set tooth, among the third sub-group of set teeth, having the set-bending side set to the right side of the straight teeth; a third left-side narrow set tooth, among the third sub-group of set teeth, having the set-bending side set to the left side of the straight teeth; a third right-side wide set tooth, among the third sub-group of set teeth, having the set-bending side set to the right side of the straight teeth; and a third left-side wide set tooth, among the third sub-group of set teeth, having the set-bending side set to the left side of the straight teeth; and
the fourth group of teeth including: successively, the fourth straight tooth; a third right-side narrow set tooth, among the fourth sub-group of set teeth, having the set-bending side set to the right side of the straight teeth; a fourth left-side wide set tooth, among the fourth sub-group of set teeth, having the set-bending side set to the left side of the straight teeth; and a fourth right-side wide set tooth, among the fourth sub-group of set teeth, having the set-bending side set to the right side of the straight teeth.

4. The saw blade according to claim 2, wherein, arrangements of saw teeth, successively from the cutting leading side, in the first arrangement of teeth and the second arrangement of teeth are set as follows:
the first group of teeth including: successively, the first straight tooth; a first left-side narrow set tooth, among the first sub-group of set teeth, having the set-bending side set to the left side of the straight teeth; a first right-side wide set tooth, among the first sub-group of set teeth, having the set-bending side set to the right side of the straight teeth; a first left-side wide set tooth, among the first sub-group of set teeth, having the set-bending side set to the left side of the straight teeth; and a first right-side narrow set tooth, among the first sub-group of set teeth, having the set-bending side set to the right side of the straight teeth;

the second group of teeth including: successively, the second straight tooth; a second left-side narrow set tooth, among the second sub-group of set teeth, having the set-bending side set to the left side of the straight teeth; a second right-side wide set tooth, among the second sub-group of set teeth, having the set-bending side set to the right side of the straight teeth; and a second left-side wide set tooth, among the second sub-group of set teeth, having the set-bending side set to the left side of the straight teeth;

the third group of teeth including: successively, the third straight tooth; a second right-side narrow set tooth, among the third sub-group of set teeth, having the set-bending side set to the right side of the straight teeth; a third left-side wide set tooth, among the third sub-group of set teeth, having the set-bending side set to the left side of the straight teeth; a third right-side wide set tooth, among the third sub-group of set teeth, having the set-bending side set to the right side of the straight teeth; and a third left-side narrow set tooth, among the third sub-group of set teeth, having the set-bending side set to the left side of the straight teeth; and the fourth group of teeth including: successively, the fourth straight tooth; a third right-side narrow set tooth, among the fourth sub-group of set teeth, having the set-bending side set to the right side of the straight teeth; a fourth left-side wide set tooth, among the fourth sub-group of set teeth, having the set-bending side set to the left side of the straight teeth; and a fourth right-side wide set tooth, among the fourth sub-group of set teeth, having the set-bending side set to the right side of the straight teeth.

5. The saw blade according to claim 2, wherein, arrangements of saw teeth, successively from the cutting leading side, in the first arrangement of teeth and the second arrangement of teeth are set as follows:

the first group of teeth including: successively, the first straight tooth; a first left-side wide set tooth, among the first sub-group of set teeth, having the set-bending side set to the left side of the straight teeth; a first right-side wide set tooth, among the first sub-group of set teeth, having the set-bending side set to the right side of the straight teeth; a first left-side narrow set tooth, among the first sub-group of set teeth, having the set-bending side set to the left side of the straight teeth; and a first right-side narrow set tooth, among the first sub-group of set teeth, having the set-bending side set to the right side of the straight teeth;

the second group of teeth including: successively, the second straight tooth; a second left-side wide set tooth, among the second sub-group of set teeth, having the set-bending side set to the left side of the straight teeth; a second right-side wide set tooth, among the second sub-group of set teeth, having the set-bending side set to the right side of the straight teeth; and a second left-side narrow set tooth, among the second sub-group of set teeth, having the set-bending side set to the left side of the straight teeth;

the third group of teeth including: successively, the third straight tooth; a third right-side wide set tooth, among the third sub-group of set teeth, having the set-bending side set to the right side of the straight teeth; a third left-side wide set tooth, among the third sub-group of set teeth, having the set-bending side set to the left side of the straight teeth; a second right-side narrow set tooth, among the third sub-group of set teeth, having the set-bending side set to the right side of the straight teeth; and a third left-side narrow set tooth, among the third sub-group of set teeth, having the set-bending side set to the left side of the straight teeth; and the fourth group of teeth including: successively, the fourth straight tooth; a fourth right-side wide set tooth, among the fourth sub-group of set teeth, having the set-bending side set to the right side of the straight teeth; a fourth left-side wide set tooth, among the fourth sub-group of set teeth, having the set-bending side set to the left side of the straight teeth; and a third right-side narrow set tooth, among the fourth sub-group of set teeth, having the set-bending side set to the right side of the straight teeth.

6. A method for arranging saw teeth in a saw blade including straight teeth and set teeth, the method comprising:

providing each of the set teeth having a set-bending side that is set to one of a left and a right side of the straight teeth, and providing each of the set teeth having a width that is set to one of a wide-width and a narrow-width, wherein a width of the wide-width is larger than a width of the narrow-width, arranging a first arrangement of teeth that is composed of, successively from a cutting leading side, a first group of teeth composed of a first straight tooth among the straight teeth and an even number of a first sub-group of set teeth among the set teeth, and a second group of teeth that is sequentially next to the first group of teeth and is composed of a second straight tooth among the straight teeth and an odd number of set teeth among the set teeth, arranging a second arrangement of teeth that is sequentially next to the first arrangement of teeth, and is composed of, successively from the cutting leading side, a third group of teeth composed of a third straight tooth among the straight teeth and an even number of a third-subgroup of set teeth having set-bending sides that are opposite to those of the even number of the first sub-group of set teeth in the first group of teeth, and a fourth group of teeth that is sequentially next to the third group of teeth and is composed of a fourth straight tooth among the straight teeth and an odd number of a fourth sub-group of set teeth whose set-bending sides are opposite to those of the odd number of the second sub-group of set teeth in the second group of teeth, arranging the first arrangement of teeth and the second arrangement of teeth alternately and repeatedly, and arranging wide set teeth having the wide-width and narrow set teeth having the narrow-width so that a ratio of a maximum value to a minimum value of the number of pitches between the narrow set teeth having an identical set-bending side and an identical set width is 1.8 or less, and a ratio of a maximum value to a minimum value of the number of pitches between the wide set teeth having an identical set-bending side and an identical set width is 2.7 or less.

7. The method for arranging saw teeth according to claim 6, wherein each of the first group of teeth and the third group of teeth includes four set teeth, and each of the second group of teeth and the fourth group of teeth includes three set teeth.

8. The method for arranging saw teeth according to claim 7, comprising
providing arrangements of saw teeth, successively from the cutting leading side, in the first arrangement of teeth and the second arrangement of teeth are set as follows:
the first group of teeth including: successively, the first straight tooth; a first left-side narrow set tooth, among the first sub-group of set teeth, having the set-bending side set to the left side of the straight teeth; a first right-side narrow set tooth, among the first sub-group of set teeth, having the set-bending side set to the right side of the straight teeth; a first left-side wide set tooth, among the first sub-group of set teeth, having the set-bending side set to the left side of the straight teeth; and a first right-side wide set tooth, among the first sub-group of set teeth, having the set-bending side set to the right side of the straight teeth;
the second group of teeth including: successively, the second straight tooth; a second left-side narrow set tooth, among the second sub-group of set teeth, having the set-bending side set to the left side of the straight teeth; a second right-side wide set tooth, among the second sub-group of set teeth, having the set-bending side set to the right side of the straight teeth; and a second left-side wide set tooth, among the second sub-group of set teeth, having the set-bending side set to the left side of the straight teeth;
the third group of teeth including: successively, the third straight tooth; a second right-side narrow set tooth, among the third sub-group of set teeth, having the set-bending side set to the right side of the straight teeth; a third left-side narrow set tooth, among the third sub-group of set teeth, having the set-bending side set to the left side of the straight teeth; a third right-side wide set tooth, among the third sub-group of set teeth, having the set-bending side set to the right side of the straight teeth; and a third left-side wide set tooth, among the third sub-group of set teeth, having the set-bending side set to the left side of the straight teeth; and
the fourth group of teeth including: successively, the fourth straight tooth; a third right-side narrow set tooth, among the fourth sub-group of set teeth, having the set-bending side set to the right side of the straight teeth; a fourth left-side wide set tooth, among the fourth sub-group of set teeth, having the set-bending side set to the left side of the straight teeth; and a fourth right-side wide set tooth, among the fourth sub-group of set teeth, having the set-bending side set to the right side of the straight teeth.

9. The method for arranging saw teeth according to claim 7, comprising providing arrangements of saw teeth, successively from the cutting leading side, in the first arrangement of teeth and the second arrangement of teeth are set as follows:
the first group of teeth including: successively, the first straight tooth; a first left-side narrow set tooth, among the first sub-group of set teeth, having the set-bending side set to the left side of the straight teeth; a first right-side wide set tooth, among the first sub-group of set teeth, having the set-bending side set to the right side of the straight teeth; a first left-side wide set tooth, among the first sub-group of set teeth, having the set-bending side set to the left side of the straight teeth; and a first right-side narrow set tooth, among the first sub-group of set teeth, having the set-bending side set to the right side of the straight teeth;
the second group of teeth including: successively, the second straight tooth; a second left-side narrow set tooth, among the second sub-group of set teeth, having the set-bending side set to the left side of the straight teeth; a second right-side wide set tooth, among the second sub-group of set teeth, having the set-bending side set to the right side of the straight teeth; and a second left-side wide set tooth, among the second sub-group of set teeth, having the set-bending side set to the left side of the straight teeth;
the third group of teeth including: successively, the third straight tooth; a second right-side narrow set tooth, among the third sub-group of set teeth, having the set-bending side set to the right side of the straight teeth; a third left-side wide set tooth, among the third sub-group of set teeth, having the set-bending side set to the left side of the straight teeth; a third right-side wide set tooth, among the third sub-group of set teeth, having the set-bending side set to the right side of the straight teeth; and a third left-side narrow set tooth, among the third sub-group of set teeth, having the set-bending side set to the left side of the straight teeth; and
the fourth group of teeth including: successively, the fourth straight tooth; a third right-side narrow set tooth, among the fourth sub-group of set teeth, having the set-bending side set to the right side of the straight teeth; a fourth left-side wide set tooth, among the fourth sub-group of set teeth, having the set-bending side set to the left side of the straight teeth; and a fourth right-side wide set tooth, among the fourth sub-group of set teeth, having the set-bending side set to the right side of the straight teeth.

10. The method for arranging saw teeth according to claim 7, comprising providing arrangements of saw teeth, successively from the cutting leading side, in the first arrangement of teeth and the second arrangement of teeth are set as follows:
the first group of teeth including: successively, the first straight tooth; a first left-side wide set tooth, among the first sub-group of set teeth, having the set-bending side set to the left side of the straight teeth; a first right-side wide set tooth, among the first sub-group of set teeth, having the set-bending side set to the right side of the straight teeth; a first left-side narrow set tooth, among the first sub-group of set teeth, having the set-bending side set to the left side of the straight teeth; and a first right-side narrow set tooth, among the first sub-group of set teeth, having the set-bending side set to the right side of the straight teeth;
the second group of teeth including: successively, the second straight tooth; a second left-side wide set tooth, among the second sub-group of set teeth, having the set-bending side set to the left side of the straight teeth; a second right-side wide set tooth, among the second sub-group of set teeth, having the set-bending side set to the right side of the straight teeth; and a second left-side narrow set tooth, among the second sub-group of set teeth, having the set-bending side set to the left side of the straight teeth;
the third group of teeth including: successively, the third straight tooth; a third right-side wide set tooth, among the third sub-group of set teeth, having the set-bending side set to the right side of the straight teeth; a third left-side wide set tooth, among the third sub-group of set teeth, having the set-bending side set to the left side of the straight teeth; a second right-side narrow set tooth, among the third sub-group of set teeth, having the set-bending side set to the right side of the straight teeth; and a third left-side narrow set tooth, among the third sub-group of set teeth, having the set-bending side set to the left side of the straight teeth; and the fourth group of teeth including: successively, the fourth straight tooth; a fourth right-side wide set tooth, among the fourth sub-group of set teeth, having the set-bending side set to the right side of the straight teeth; a fourth left-side wide set tooth, among the fourth sub-group of set teeth, having the set-bending side set to the left side of the straight teeth; and a third right-side narrow set tooth, among the fourth sub-group of set teeth, having the set-bending side set to the right side of the straight teeth.

* * * * *

UNITED STATES PATENT AND TRADEMARK OFFICE
CERTIFICATE OF CORRECTION

PATENT NO.         : 9,821,391 B2
APPLICATION NO.    : 14/412022
DATED              : November 21, 2017
INVENTOR(S)        : S. Taujimoto et al.

Page 1 of 1

It is certified that error appears in the above-identified patent and that said Letters Patent is hereby corrected as shown below:

At Column 23, Line 58 (Claim 2, Line 2), please change "group first group" to -- first group --.

Signed and Sealed this
Twenty-sixth Day of June, 2018

Andrei Iancu
*Director of the United States Patent and Trademark Office*